(12) United States Patent
Houle et al.

(10) Patent No.: US 7,606,407 B2
(45) Date of Patent: *Oct. 20, 2009

(54) SYSTEMS AND METHODS OF ASSESSING MULTI-FIELD DOCUMENTS USING MULTIPLE PROFILE REPRESENTATIONS

(75) Inventors: Gilles Houle, Walnut Creek, CA (US); Ronny Bakker, Mydrecht (NL); Johan Willem Piere Berkhuysen, Maarssen (NL); Malayappan Shridhar, W. Bloomfield, MI (US); James G. Mason, Alameda, CA (US); Katerina Blinova, Oakland, CA (US); Babur Nugmanov, Oakland, CA (US)

(73) Assignee: Computer Sciences Corporation, El Segundo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/649,592

(22) Filed: Jan. 3, 2007

(65) Prior Publication Data

US 2007/0110312 A1 May 17, 2007

Related U.S. Application Data

(60) Division of application No. 10/734,738, filed on Dec. 12, 2003, now Pat. No. 7,272,259, which is a continuation of application No. 10/389,297, filed on Mar. 14, 2003, now abandoned.

(60) Provisional application No. 60/364,675, filed on Mar. 15, 2002.

(51) Int. Cl.
*G06K 9/00* (2006.01)

(52) U.S. Cl. .................................. 382/137; 382/176

(58) Field of Classification Search ................ 382/187, 382/190, 168, 176, 177, 173, 181, 179, 188, 382/206, 232, 254, 278
See application file for complete search history.

(56) References Cited

U.S. PATENT DOCUMENTS 3,806,704 A 4/1974 Shinal (Continued)

FOREIGN PATENT DOCUMENTS

GB A1.2 271 657 4/1994

OTHER PUBLICATIONS

Arazi, B.: 1977, Handwriting identification by means of run-length measurements, IEEE Trans. Syst., Man and Cybernetics SMC-7 (12), 878-881.

(Continued)

*Primary Examiner*—Sheela C Chawan
(74) *Attorney, Agent, or Firm*—Meyertons, Hood, Kivlin, Kowert & Goetzel, P.C.; Eric B. Meyertons

(57) ABSTRACT

Methods and systems are provided for analyzing and assessing documents using a writing profile for documents, such as a payment instrument. A method may include providing a document to a computer system. The document may include two or more information fields. In an embodiment, a method includes obtaining information on writing in an information field of the document, comparing the obtained written information in the information field and written information in at least one other information field to at least two writing profile representations from at least one other document. At least two of the writing profile representations may include written information from the information field and written information from at least one of the other information fields from at least one other document.

35 Claims, 31 Drawing Sheets

U.S. PATENT DOCUMENTS

| | | | |
|---|---|---|---|
| 4,646,351 | A | 2/1987 | Asbo et al. |
| 4,724,542 | A | 2/1988 | Williford |
| 5,454,046 | A | 9/1995 | Carman, II |
| 5,504,822 | A | 4/1996 | Holt |
| 5,680,470 | A | 10/1997 | Moussa et al. |
| 5,710,916 | A | 1/1998 | Barbara et al. |
| 5,748,780 | A | 5/1998 | Stolfo |
| 5,757,960 | A | 5/1998 | Murdock et al. |
| 5,828,772 | A | 10/1998 | Kashi et al. |
| 5,909,500 | A | 6/1999 | Moore |
| 5,995,953 | A | 11/1999 | Rindtorff et al. |
| 6,084,985 | A | 7/2000 | Dolfing et al. |
| 6,097,834 | A | 8/2000 | Krouse et al. |
| 6,108,444 | A | 8/2000 | Syeda-Mahmood |
| 6,129,273 | A | 10/2000 | Shah |
| 6,157,731 | A | 12/2000 | Hu et al. |
| 6,236,740 | B1 | 5/2001 | Lee |
| 6,249,604 | B1 | 6/2001 | Huttenlocher et al. |
| 6,307,955 | B1 | 10/2001 | Zank et al. |
| 6,393,138 | B1 | 5/2002 | Chai |
| 6,424,728 | B1 | 7/2002 | Ammar |
| 6,464,134 | B1 | 10/2002 | Page |
| 6,836,555 | B2 | 12/2004 | Ericson et al. |
| 7,272,259 | B2 * | 9/2007 | Houle et al. ............ 382/187 |
| 7,545,959 | B2 | 6/2009 | Houle et al. |
| 7,545,982 | B2 | 6/2009 | Houle et al. |
| 7,555,162 | B2 | 6/2009 | Houle et al. |
| 2004/0218801 | A1 | 11/2004 | Houle et al. |
| 2004/0223637 | A1 | 11/2004 | Houle et al. |
| 2004/0228513 | A1 | 11/2004 | Houle et al. |
| 2004/0228514 | A1 | 11/2004 | Houle et al. |
| 2004/0237047 | A1 | 11/2004 | Houle et al. |
| 2005/0091500 | A1 | 4/2005 | Okazaki |
| 2007/0110311 | A1 | 5/2007 | Houle et al. |
| 2007/0110313 | A1 | 5/2007 | Houle et al. |
| 2007/0110314 | A1 | 5/2007 | Houle et al. |

OTHER PUBLICATIONS

Arazi, B.: 1983, Automatic handwriting identification based on the external properties of the samples, IEEE Trans. Syst., Man and Cybernetics SMC-13 (4), 635-642.

Drouhard, J., Sabourin, R. and Godbout, M.: 1995, A comparative study of the k nearest neighbours, threshold and neural network classifiers for handwritten signature verification using an enhanced directional pdf, Proc. of the 3rd International Conference on Document Analysis and Recognition, Montreal, Canada, pp. 807-810.

Klement, V.: 1983, An application system for the computer-assisted identification of handwriting, Proc. Int. Carnahan Conf. on Security Technol., Zurich, Switzerland, pp. 75-79.

Kondo, S. and Attachoo, B.: 1986, Model of handwriting process and its analysis, Proc. ICPR, pp. 562-565.

Maarse, F., Schomaker, L. and Teulings, H.L.: 1988, Automatic identification of writers, in G. van der Veer and G. Mulder (eds), Human-Computer Interaction: Psychonomic Aspects, Springer, New York, pp. 353-360.

Maarse, F. and Thomassen, A.: 1983, Produced and perceived writing slant: differences between up and down strokes, ACTA Psychologica 54 (1-3), 131-147.

Plamondon, R. and Srihari, S.N.: 2000, On-line and off-line handwriting recognition: a comprehensive survey, IEEE Transactions on Pattern Analysis and Machine Intelligence 22 (1), 63-84.

Plamondon, R. and Lorette, G.: 1989, Automatic signature verification and writer identification-the state of the art, Pattern Recognition 22(2), 107-131.

Sabourin, R. and Drouhard, J.: 1992, Off-line signature verification using directional pdf and neural networks, Proc. of the 11th International Conference on Pattern Recognition (ICPR 1992), The Hague, Netherlands, pp. 321-325.

Said, H., Peake, G., Tan, T. and Baker, K.: 1998, Writer identification based on handwriting, Pattern Recognition 33(1), 149-160.

Steinke, K.: 1981, Recognition of writers by handwriting images, Pattern Recognition 14 (1-6), 357-364.

Vuurpijl, L. and Schomaker, L.: 1997, Finding structure in diversity: A hierarchical clustering method for the categorization of allographs in handwriting, Proc. of 4th ICDAR, IEEE, Ulm, Germany, pp. 387-393.

Zois, E. and Anastassopoulos, V.: 2000, Morphological waveform coding for writer idetification, Pattern Recognition 33 (3), 385-398.

Bajaj, R. and Chaudhury, S., "Signature Verification Using Multiple Neural Classifiers," Pattern Recognition, vol. 30, No. 1, pp. 1-7, 1997.

Bauer, F. and Wirtz, B., "Parameter Reduction and Personalized Parameter Selection for Automatic Signature Verification," Proc. 3rd International Conference Document Analysis and Recognition (ICDAR '95), pp. 183-186, Montreal, Aug. 1995.

Bouletreau, V. Vincent, N., Sabourin, R. and Emptoz, H., "Handwriting and Signature: One or Two Personality Identifiers?" Proc. 14th International Conference Pattern Recognition, pp. 1,758-1,760, Brisbane, Australia, Aug. 1998.

Cardot, H., Revenu, M., Victorri, BI and Revillet, M.J., "A Static Signature Verification System Based on a Cooperative Neural Network Architecture," Int'l J. Pattern Recognition and Artificial Intelligence, vol. 8, No. 3, pp. 679-692, 1994.

Cordella, C.P., Foggia, P., Sansone, C. and Vento, M., "Document Validation by Signatures: A Serial Multi-Expert Approach," Proc. International Conference Document Analysis and Recognition (ICDAR '99), pp. 601-604, Bangalore, India, Sep. 1999.

Dehghan, M., Faez, K. and Fathi, M., "Signature Verification Using Shape Descriptors and Multiple Neural Networks," Proc. IEEE TENCON—Speech and Image Technologies for Computing and Telecommunications Conf., vol. 1, pp. 415-418, 1997.

Dolfing, J.G.A., Aarts, E.H.L. and Van Oosterhout, J.J.G.M., "On-Line Verification Signature with Hidden Markov Models," Proc. 14th International Conference Pattern Recognition, pp. 1,309-1,312, Brisbane, Australia, Aug. 1998.

Drouhard, J.P., Sabourin, R. and Godbout, M., "Neural Network Approach to Off-Line Signature Verification Using Directional PDF," Pattern Recognition, vol. 29, No. 3, pp. 415-424, 1996.

Foltyniewicz, R. and Sitnik, M., "Verification of Persons via Face and Signature Analysis," Proc. International Conference Image Processing (ICIP), vol. 3, pp. 495-498, 1996.

Guillevic, D. and Suen, C.Y., "HMM-KNN Word Recognition Engine for Bank Cheque Processing," Proc. 14th International Conference Pattern Recognition, pp. 1,526-1,529, Brisbane, Australia, Aug. 1998.

Guo, J.K., Doermann, D. and Rosenfeld, A., "Local Correspondence for Detecting Random Forgeries," Proc. 4th International Conference Document Analysis and Recognition (ICDAR '97), pp. 319-323, Ulm, Germany, Aug. 1997.

Huang, K. and Yan, H., "Off-Line Signature Verification Based on Geometric Feature Extraction and Neural Network Classification," Pattern Recognition, vol. 30, No. 1, pp. Sep. 17, 1997.

Kim, G. and Govindaraju, V., "Bankcheck Recognition Using Cross Validation Between Legal and courtesy Amounts," International Journal Pattern Recognition and Artificial Intelligence, vol. 11, No. 4, pp. 657-674, 1997.

Kim, s.H., Park, M.S. and Kim J., "Applying Personalized Weights to a Feature Set for On-Line Signature Verification," Proc. 3rd International Conference Document Analysis and Recognition (ICDAR '95), pp. 882-885, Montreal, Aug. 1995.

Leclerc, F. and Plamondon, R., "Automatic Signature Verification: The State of the Art, 1989-1993," International Journal Pattern Recognition and Artificial Intelligence, special issue signature verification, vol. 8, No. 3, pp. 643-660, 1994.

Liu, K., Suen, C.Y., Cheriet, M., Said, J.N., Nadal, C. and Tang, Y.Y., "Automatic Extraction of Baselines and Data from Check Images," International Journal Pattern Recognition and Artificial Intelligence, vol. 11, No. 4, pp. 675-697, 1997.

Mackowiak, J., Schomaker, L.R.B. and Vuurpijl, L., "Semi-Automatic Determination of Allograph Duration and Position in On-Line Handwriting Words Based on the Expected Number of Strokes," Progress in Handwriting Recognition. A.C. Downton and S. Impedovo, eds., London: World Scientific, 1997.

Olivier, C., Paquet, T., Avila, M. and Lecourtier, Y., "Optimal Order of Markov Models Applied to Bankchecks," International Journal Pattern Recognition and Artificial Intelligence, vol. 11, No. 5, pp. 789-800, 1997.

Qi, Y. and Hunt, B.R., "Multiresolution Approach to a Computer Verification of Handwritten Signatures," IEEE Trans. Image Processing, vol. 4, No. 6, pp. 870-874, 1995.

Rigoll, G. and Kosmala, A., "A Systematic comparison Between On-Line and Off-Line Methods for Signature Verification with Hidden Markov Models," Proc. 14th International Conference Pattern Recognition (ICPR), vol. 2, pp. 1,755-1,757, Brisbane, Australia, Aug. 1998.

Sabourin, R. Drouhard, J.P. and Wah, E.S., "Shape Matrices as a Mixed Shape Factor for Off-Line Signature Verification," Proc. 4th International Conference Document Analysis and Recognition (ICDAR '97), pp. 661-665, Ulm, Germany, Aug. 1997.

Sabourin, R., Genest, G. and Preteux, F., "Off-Line Signature Verification by Local Granulometric Size Distributions," IEEE Trans. Pattern Analysis and Machine Intelligence, vol. 19, No. 9, pp. 976-988, 1997.

Sabourin, R., Plamondon, R. and Lorette, G., "Off-Line Identification with Handwritten Signature Images: Survey and Perspectives," Structured Document Image Analysis. H. Baird, H. Bunke, and K. Yamamoto, eds., pp. 219-234, Berlin, Heidelberg, New York, Tokyo: Springer-Verlag, 1992.

Sagar, V.K., Chong, S.W., Leedham, C.G. and Solihin, Y., "Slant Manipulation and Character Segmentation for Forensic document Examination," IEEE TENCON—Digital Signal Processing Applications, pp. 933-938, 1996.

Deng, P.S., Liao, H.Y.M., Ho, C.W. and Tyan, H.R., "Wavelet-Based Off-Line handwritten Signature Verification," Computer Visionel Image Understanding, 76(3), pp. 173-190, 1999.

Wirtz, B., "Stroke-Based Time Warping for Signature Verification," Proc. 3rd International Conference Document Analysis and Recognition (ICDAR '95), pp. 179-182, Montreal, Aug. 1995.

Yang, L., Widjaja, B.K. and Prasad, R., "Application of Hidden Markov Models for Signature Verification," Pattern Recognition, vol. 28, No. 2, pp. 161-170, 1995.

G. Dimauro, S. Impedovo, G. Pirlo, and A. Sazo, "A Multi-Expert Signature Verification System for Bankcheck Processing, " Int'l J. Pattern Recognition and Artificial Intelligence, vol. 11, No. 5, pp. 827-844, 1997.

de Jong, W., Kroon van der Kooij, L. and Schmidt, D.: 1994, Computer aided analysis of handwriting, the NIFO-TNO approach, Proc. of the 4th European Handwriting Conference for Police and Government Handwriting Experts.

Huber, R.A. and Headrick, A.: 1999, Handwriting Identification: Facts and Fundamentals, CRC Press, Boca Raton.

Klement, V.: 1981, Forensic writer recognition, in J. Simon and R. Haralick (eds), Proc. NATO Adv. Stud. Inst., pp. 519-524.

Klement, V., Steinke, K. and Naske, R.: 1980, The application of image processing and pattern recognition techniques to the forensic analysis of handwriting, Proc. 1980 Int. Conf. Security through Sci. Engin., West Berlin, Germany, pp. 5-11.

Kuckuck, W.: 1980, Writer recognition by spectrum analysis, Proc. 1980 Int. Conf. Security through Sci. Engin., West Berlin, Germany, pp. 1-3.

Kuckuck, W., Rieger, B. and Steinke, K.: 1979, Automatic writer recognition, Proc. 1979 Carnahan Conf. on Crime Countermeasures, University of Kentucky, Lexington, pp. 57-64.

Morris, R.N.: 2000, Forensic Handwriting Identification: Fundamental Concepts and Principles, first edn, Academic Press, London.

Naske, R.: 1982, Writer recognition by prototype related deformation of handprinted characters, Proc. of the 6th International Conference on pattern Recognition, vol. 2, Munich, Germany, pp. 819-822.

Said, H., Peake, G., Tan, T. and Baker, K.: 1998, Writer identification from non-uniformly skewed handwriting images, Proc. of the 9th British Machine Vision Conference, pp. 478-487.

Schomaker, L. and Vuurpijl, L.: 2000, Forensic writer identification: A benchmark data set and a comparison of two systems [internal report for the Netherlands Forensic Institute], Technical report, Nijmegen: NICI.

Bradford, R. and Bradford, R.B., Introduction to Handwriting Examination and Identification. Nelson-Hall, 1992.

Dimauro, G., Impedovo, S., Pirlo, G. and A. Salzo, "Automatic Bankcheck Processing: A New Engineered System," Machine Perception and Artificial Intelligence, S. Impedovo, P.S.P. Wang, and H. Bunke, eds., vol. 28, pp. 5-42, World Scientific, 1997.

Forte, A.M. and Impedovo, S., "A New Adaptive Neural Network for an Off-Line Signature Verification System," Proc. Int'l Conf. Pattern Recognition, pp. 355-363, 1996.

Pattern Recognition, special issue on automatic signature verification, R. Plamondon, ed., vol. 8, No. 3, Jun. 1994.

Plamondon, R., Guerfali, W. and M. Lalonde, "Automatic Signature Verification: A Report on a Large-Scale Public Experiment," Proc. Ninth Biennial Conf. Int'l Graphonomics Soc., pp. 9-13, Singapore, Jun. 1999.

Forensic, Developmental, and Neuropsychological Aspects of Handwriting, special issue, J. Forensic Document Examination, M. Simner, W. Hulstijn, and P. Girouard, eds.

Dikstra et al., "IRIS An Image Recognition and Interpretation System for the Dutch Postbank", Sep. 3, 2000, pp. 23-26, Pattern Recognition, 2000 Proceedings.

Knerr et al., "Hidden Markov Model Based Word Recognition and Its Application to Legal Amount Reading on French Checks", Jun. 1998, pp. 404-419, Computer Vision and Image Understanding, vol. 70, No. 3.

Suen et al., "Automatic Recognition of Handwritten Data on Cheques-Fact or Fiction?", Nov. 1999, pp. 1287-1295, Pattern Recognition Letters, North-Holland Publ., Amsterdam, NL, vol. 20, No. 11-13.

Srihari et al., "Document Image-Processing System For Name and Address Recognition", Dec. 21, 1996, pp. 379-391, International Journal of Imaging Systems and Technology, Wiley and Sons, New York, vol. 7, No. 4.

Kaufmann et al., "Amount Translation and Error Localization in Check Processing Using Syntax-Directed Translation," 1998, pp. 1530-1534, Proc. Int. Conf. on Pattern Recognition, Brisbane, Australia.

International Search Report for European Application No. 03005807.7 mailed May 20.

Office Communication for European Application No. 03005807.7 mailed Mar. 9.

Notice of Opposition, EPO Application No. /Patent No. 03005807. 7-2218/1345163; Mailed Dec. 13, 2007.

International Publication WO 01/41051 by Ketel; International Publication Date Jun. 7, 2001.

CSC: ETA-Fraud Detection brochure (1 page).

Hardcastle, et al., "A computer-based system for the classification of handwriting on cheques. Part 2: Cursive handwriting" Journal of Forensic Science Society, 1990, pp. 97-103.

Schroeder, "A revised method of classifying fraudulent checks in a document examination laboratory," Forensic Science Journal, vol. 19, No. 3, 1974, pp. 618-635.

Crane, et al., "Does the amount of handwriting on a check constitute a "reasonable amount of a sample"?" Canadian Society of Forensic Science, Mar. 1999, vol. 32, No. 1, pp. 39-45.

U.S. Patent and Trademark Office, "Communication" for U.S. Appl. No. 10/714,523 mailed Feb. 20, 2008, available in PAIR.

U.S. Patent and Trademark Office, "Communication" for U.S. Appl. No. 10/734,738 mailed Feb. 23, 2007, available in PAIR.

U.S. Patent and Trademark Office, "Communication" for U.S. Appl. No. 10/741,156 mailed Aug. 23, 2007 available in PAIR.

U.S. Patent and Trademark Office, "Communication" for U.S. Appl. No. 10/741,156 mailed Nov. 30, 2007 available in PAIR.

U.S. Patent and Trademark Office, "Communication" for U.S. Appl. No. 11/649,639 mailed May 2, 2007 available in PAIR.

U.S. Patent and Trademark Office, "Communication" for U.S. Appl. No. 11/649,640 mailed May 2, 2007 available in PAIR.

U.S. Patent and Trademark Office, "Communication" for U.S. Appl. No. 11/649,640 mailed Jan. 9, 2008 available in PAIR.

U.S. Patent and Trademark Office, "Communication" for U.S. Appl. No. 11/649,591 mailed May 2, 2007 available in PAIR.

Correspondence concerning written submission in Opposition, EPO Application No. Patent No. 03005807.7-2218/1345163; dated Apr. 14, 2008 (S2).

Naske, R.: 1982, Writer recognition by prototype related deformation of handprinted characters, Proc. of the 6th International Conference on pattern Recognition, vol. 2, Munich, Germany, pp. 819-822. (D10/R50).

U.S. Patent and Trademark Office, Notice of Allowance for U.S. Appl. No. 10/735,280 mailed May 21, 2008, available in PAIR.

Impedovo, S, Wang, P.S.P, Bunke, H., eds. 1997, Automatic Bankcheck Processing, World Scientific, Singapore.

U.S. Patent and Trademark Office, "Communication" for U.S. Appl. No. 10/741,156 mailed Jul. 9, 2008 available in PAIR.

U.S. Patent and Trademark Office, "Communication" for U.S. Appl. No. 11/649,591 mailed Aug. 13, 2008 available in PAIR.

U.S. Patent and Trademark Office, "Communication" for U.S. Appl. No. 11/649,639 mailed Sep. 5, 2008 available in PAIR.

U.S. Patent and Trademark Office, Notice of Allowance for U.S. Appl. No. 10/735,280 mailed Sep. 15, 2008, available in PAIR.

U.S. Patent and Trademark Office, Notice of Allowance for U.S. Appl. No. 10/714,523 mailed Aug. 22, 2008, available in PAIR.

Bradford, R. and Bradford, R.B., Introduction to Handwriting Examination and Identification. Nelson-Hall, 1992.

U.S. Patent and Trademark Office, "Communication" for U.S. Appl. No. 10/741,157 mailed Sep. 2, 2008 available in PAIR.

Correspondence concerning written submission in Opposition, EPO Application No. Patent No. 03005807.7-2218/1345163; dated Jan. 22, 2009 (S3).

U.S. Patent and Trademark Office, "Communication" for U.S. Appl. No. 10/714,523 mailed Jan. 8, 2009, available in PAIR.

U.S. Patent and Trademark Office, Notice of Allowance for U.S. Appl. No. 10/735,280 mailed Feb. 2, 2009, available in PAIR.

U.S. Patent and Trademark Office, "Notice of Allowance" for U.S. Appl. No. 10/741,156 mailed Feb. 24, 2009 available in PAIR.

U.S. Patent and Trademark Office, "Notice of Allowance" for U.S. Appl. No. 11/649,640 mailed Jan. 27, 2009 available in PAIR.

U.S. Patent and Trademark Office, "Communication" for U.S. Appl. No. 11/649,591 mailed Feb. 4, 2009, available in PAIR.

Summons to attend oral proceedings, EPO Application No. Patent No. 03005807.7-2218/1345163; dated Jul. 15, 2009 (S4).

U.S. Patent and Trademark Office, "Communication" for U.S. Appl. No. 10/714,523 mailed May 20, 2009, available in PAIR.

U.S. Patent and Trademark Office, "Communication" for U.S. Appl. No. 10/741,157 mailed Jul. 2, 2009 available in PAIR.

U.S. Patent and Trademark Office, "Notice of Allowance" for U.S. Appl. No. 11/649,591 mailed Jul. 28, 2009, available in PAIR.

U.S. Patent and Trademark Office, Issue Notification for U.S. Appl. No. 10/741,156 mailed Jun. 30, 2009 available in PAIR.

U.S. Patent and Trademark Office, "Notice of Allowance" for U.S. Appl. No. 11/649,639 mailed May 15, 2009 available in PAIR.

* cited by examiner 348   350  349

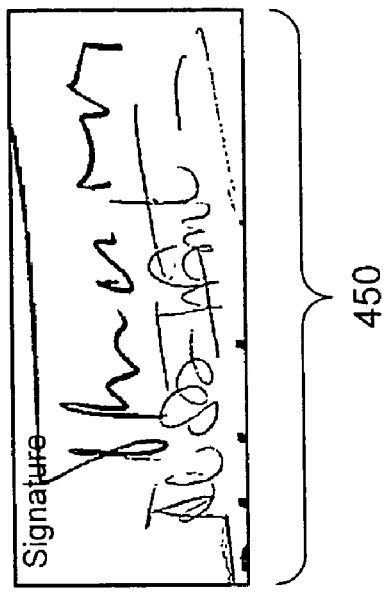
Fig. 20
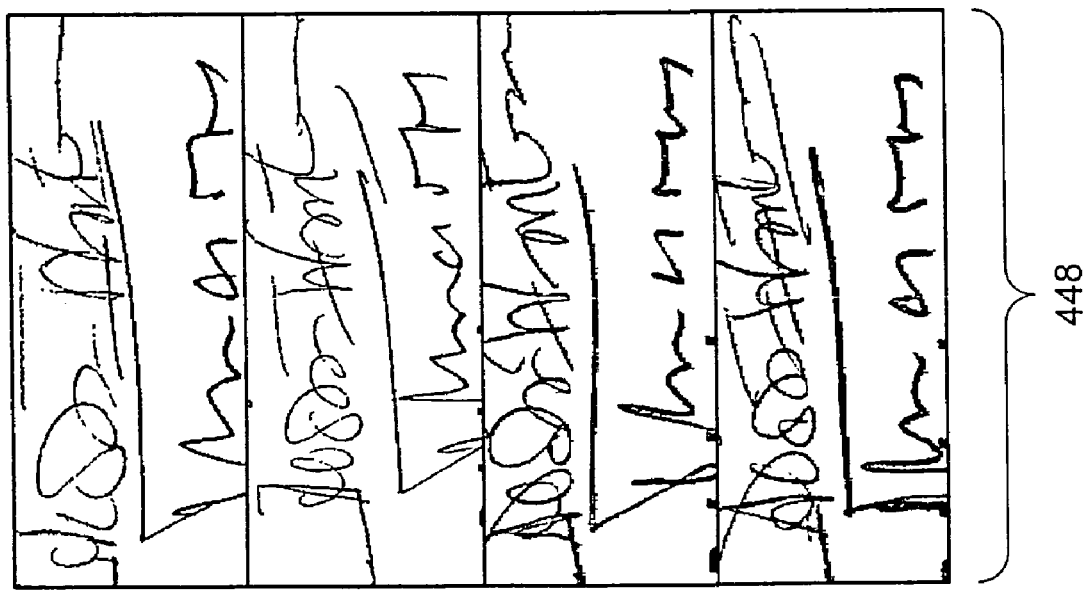

Fill with blue ink

From ABC account 3 1. 2 4 0 0 3 2 2 ■

From other ABC account

Add in guilders    cents 2 0 8 6, 6 5  ← 434

Payment code / Description

S A L g

Debit name /
city block

Transfer in guilders

To account 01 5972 1

From h. Cross

In

Soml

Signature
← 436

ABC [signature]

Bank

Lexicon: { BUNSCHOTEN(13) HILVERSUM(2),NUUNSPUR(2), AMERSFOORT(11), SOESTERBERG(11), SOEST(8), BAARN(3), APELDOORN(1)}

| 1. | Empty | 21. | FAKT 202321 | 41. | SAL 10 |
|---|---|---|---|---|---|
| 2. | FAKT 202321 | 22. | FAKT 2001335 | 42. | SAL 10 |
| 3. | SAL 8 REIS 9 | 23. | FAKT 2001216 | 43. | SAL 10 |
| 4. | SAL 8 +REIS | 24. | SOFI 60761799 | 44. | SAL 10 |
| 5. | SAL 8 REIS 9 | 25. | SAL 9 | 45. | SAL 10 REIS 11 |
| 6. | SAL 8 | 26. | SAL + REIS 9 | 46. | SAL 10 |
| 7. | SAL 8 | 27. | SAL 9 | 47. | SAL 10 |
| 8. | SAL 8 | 28. | SAL 9 | 48. | SAL 10 |
| 9. | SAL 8 REIS 9 | 29. | SAL 9 REIS 10 | 49. | SAL 10 |
| 10. | SAL 8 | 30. | SAL 9 | 50. | SAL 10 |
| 11. | SAL 8 | 31. | SAL 9 | 51. | OMZETREL. OKT 2001 |
| 12. | SAL 8 | 32. | SAL 9 | | |
| 13. | SAL 7+8 | 33. | SAL 9 | | |
| 14. | SOFI 60761799 | 34. | SAL 9 | | |
| 15. | FAKT 103018 | 35. | SAL 9 | | |
| 16. | FAKT 2001146 | 36. | FAKT 013593 | | |
| 17. | 21.055 | 37. | SAL 9 | | |
| 18. | FAKT 21077 | 38. | SAL 9 | | |
| 19. | FAKT 21102 | 39. | SOFI 60761799 | | |
| 20. | FAKT 21134 | 40. | SAL 9 | | |

Salaris +Vacantie — 466

Fig. 33

424 → T. VERSCHOOR OFFICE SUPPLY B. V. OUD BEIJERLAND

425 → T. VERSCHOOR OFFICE SUPPLY B.V. OUD BEIJERLAND

426 → T. VERSCHOOR OFFICE SUPPLY B.V. OUD BEIJERLAND

Provide a document to a computer system with writing in at least one information field that includes at least two examples of a type of written information
592

Compare at least two of the examples
594

Assess whether two or more of the examples approximately match
596

Fig. 40a — 372 (Amount in guilders / Cents: 9476,76), 374 (To account: 5454326)

Fig. 40b — 376 (Amount in guilders / Cents: 28484,50), 378 (To account: 652546)

Fig. 40c — 380 (Amount in guilders / Cents: 9535,13), 382 (To account: 035511205/)

Fig. 40d — 384 (Amount in guilders / Cents: 7279,49), 386 (To account: 574435220)

SYSTEMS AND METHODS OF ASSESSING MULTI-FIELD DOCUMENTS USING MULTIPLE PROFILE REPRESENTATIONS

PRIORITY CLAIM

This application is a divisional application of U.S. patent application Ser. No. 10/734,738 entitled "Systems and Methods for Capturing Handwritten Information Using Handwriting Analysis" filed by Houle, et al. on Dec. 12, 2003, now U.S. Pat. No. 7,272,259, which is a continuation application of U.S. patent application Ser. No. 10/389,297 entitled "Systems and Methods for Capturing Handwritten Information Using Handwriting Analysis" filed by Houle, et al. on Mar. 14, 2003 now abandoned, which claims priority to U.S. Provisional Application No. 60/364,675 entitled "Systems and Methods for Handwriting Analysis in Documents," filed Mar. 15, 2002. The above-referenced applications are hereby incorporated by reference as if fully set forth herein.

BACKGROUND OF THE INVENTION

1. Field of the Invention

The present invention generally relates to analyzing information in documents such as payment instruments. Certain embodiments relate to computer-implemented systems and methods for analyzing and assessing documents.

2. Description of the Related Art

Fraud related to forgery of documents, such as checks, has increased steadily worldwide over the past few years. For example, in Europe fraud has doubled in the past two years. This is a very difficult problem mainly because of the wide range of techniques used to reroute money from an account to a fraudulent account. Fraud may be found in any document-based business where money transfers take place. There has been a significant amount of effort applied in developing technology, such as signature verification, for assessing forgeries in financial documents.

Many financial institutions, such as banks, are required to keep copies of processed financial documents for a long period of time, for example, months, and even years. Such institutions commonly employ image-based financial document systems that store images of processed documents in the form of images on a database on a computer system.

Databases including images depicting handwriting known to be authentic are an important resource for methods and systems of assessing forgery. A handwriting sample of unknown validity, such as a signature, may be compared to images in such a database to determine if the handwriting sample is a forgery. However, such a process may be difficult and expensive if the database includes a very large amount of image data. In addition, many methods and systems for assessing forgery in financial documents focus on assessing forgery in a limited portion of the document, for example, of a signature. Such methods and systems may lead to a large number of financial documents being incorrectly labeled as containing forgeries, as well as failing to identify forged contents in non-signature portions of a document.

U.S. Pat. No. 6,157,731 Hu et al. discloses a signature verification method and is incorporated by reference as if fully set forth herein. The method involves segmenting a smoothed and normalized signature and, for each segment, evaluating at least one local feature to obtain a feature value vector.

A method and system of recognizing handwritten words in scanned documents is disclosed in U.S. Pat. No. 6,108,444 to Syeda-Mahmood and is incorporated by reference as if fully set forth herein. A method of detecting and recognizing handwritten words is described. The applications described in the patent are directed to the use of handwriting recognition algorithms as part of keyword searches.

U.S. Pat. No. 6,084,985 to Dolfing et al. discloses a method for on-line handwriting recognition and is incorporated by reference as if fully set forth herein. The method employs feature vectors based on aggregated observations.

U.S. Pat. No. 5,995,953 to Rindtorff et al. discloses a method of comparing handwriting and signatures and is incorporated by reference as if fully set forth herein. The method relies on comparison of features of a signature rather than the images of signatures.

U.S. Pat. No. 5,909,500 to Moore discloses a method of signature verification and is incorporated by reference as if fully set forth herein. The method is based on analysis of the environs attendant to the signature string.

U.S. Pat. No. 5,710,916 to Barbara et al. discloses a method and apparatus for similarity matching of handwritten data objects and is incorporated by reference as if fully set forth herein.

A method of signature verification is disclosed in U.S. Pat. No. 5,828,772 to Kashi et al. The method compares the numerical values of parameters evaluated on a trial signature with stored reference data derived from previously entered reference signatures.

U.S. Pat. No. 5,680,470 to Moussa et al. discloses a method of automated signature verification and is incorporated by reference as if fully set forth herein. In the method, a test signature, for example, a signature entered by an operator, may be preprocessed and examined for test features. The test features may be compared against features of a set of template signatures, and verified in response to the presence or absence of the test features in the template signatures.

U.S. Pat. No. 5,454,046 to Carman discloses a universal handwriting recognition system and is incorporated by reference as if fully set forth herein. The system converts user-entered time ordered stroke sequences into computer readable text.

SUMMARY OF THE INVENTION

An embodiment of the present invention relates to a computer-implemented method for analyzing and assessing fraud in documents. Analysis and assessment of documents may use a profile created for authorized writers of a document.

In one embodiment, a method of generating a writing profile on a computer system may include providing one or more documents to the computer system. In some embodiments, at least one of the documents may include at least one information field. In other embodiments, at least one of the documents may include at least two information fields. The method may further include determining at least one writing profile representation for at least two of the information fields using writing from at least one of the information fields. Alternatively, the method may include determining at least one writing profile representation for at least one of the information fields using writing from at least two of the information fields. In other embodiments, at least two writing profile representations for at least one of the information fields may be assessed using writing from at least one of the information fields.

In an embodiment, a method of generating a writing profile on a computer system may further include providing one or more additional documents to the computer system. At least one of the additional documents may include at least one information field. In another embodiment, at least one of the additional documents may include at least two information fields. The method may further include updating at least one of the writing profile representations using at least one of the information fields of at least one of the additional documents.

In an embodiment, a method of assessing a document using a computer system may include providing a document to the computer system. In some embodiments, the document may include at least one information field. Alternatively, the document may also include at least two information fields. The method may further include comparing writing in at least two of the information fields of the document to at least one writing profile representation. At least one writing profile representation may be from at least one information field of at least one other document. Alternatively, the method may include comparing writing in at least one of the information fields of the document to at least one writing profile representation. At least one writing profile representation may be from at least two information fields of at least one other document. In other embodiments, writing in at least one of the information fields of the document may be compared to at least two writing profile representations. At least two writing profile representations may be from at least one information field of at least one other document.

In one embodiment, a method of assessing information in a document using a computer system may include obtaining information on writing in an information field of a document. The document may include at least two information fields. The method may further include comparing the obtained written information in the information field and written information in at least one other information field to at least one writing profile representation. In another embodiment, the method may include comparing the obtained written information in the information field and written information in at least two other information fields to at least one writing profile representation. Alternatively, the obtained written information in the information field and written information in at least one other information field may be compared to at least two writing profile representations from at least one other document.

In some embodiments, at least one of the writing profile representations may include written information from the information field and written information from at least one of the other information fields. In other embodiments, at least one of the writing profile representations may include written information from the information field and written information from at least two of the other information fields from at least the one of the other documents. Alternatively, at least two of the writing profile representations may include written information from the information field and written information from at least one of the other information fields from at least the one other document.

In an embodiment, a method of identifying a document with forged information using a computer system may include providing a document to the computer system. The document may include at least one information field. Alternatively, the document may include at least two information fields. The method may further include comparing writing in at least two of the information fields of the document to at least one forger writing profile representation. At least one forger writing profile representation may be from at least one information field of at least one document that includes forged information. In another embodiment, the method may include comparing writing in at least one of the information fields of the document to at least one forger writing profile representation. At least one forger writing profile may be from at least two information fields of at least one document that includes forger information. Alternatively, writing in at least one of the information fields of the document may be compared to at least two forger writing profile representations. At least one forger writing profile representation may be from at least one information field of at least one document that includes forger information.

The method may additionally include identifying the document as a document that includes forged information. The identification may be made from an approximate match of at least one forger writing profile representation with writing in the document.

In certain embodiments, a method of capturing written information from an information field of a document using a computer system may include providing a document to the computer system. The document may include at least one information field. The method may further include assessing whether writing in an information field approximately matches a writing profile representation. The writing profile representation may be from at least one information field from at least one other document. In an embodiment, at least one matching writing profile representation is associated with a corresponding text representation in a computer processable format in memory on the computer system. Additionally, the method may include associating the information field with the text representation corresponding to the matching writing profile representation.

In an embodiment, a method of assessing a document using a computer system may include providing a document to the computer system. In some embodiments, the document may include at least one information field. Alternatively, the document may include at least two information fields. The method may further include comparing pre-printed information in at least two of the information fields of the document to at least one pre-printed profile representation. At least one pre-printed profile representation may be from at least one information field of at least one other document. Alternatively, the method may include comparing pre-printed text in at least one of the information fields of the document to at least one pre-printed profile representation. At least one pre-printed profile representation may be from at least one information field of at least one other document. In other embodiments, pre-printed information in at least one of the information fields of the document may be compared to at least two pre-printed profile representations. At least two pre-printed profile representations may be from at least one information field of at least one other document.

BRIEF DESCRIPTION OF THE DRAWINGS

A better understanding of the present invention may be obtained when the following detailed description of preferred embodiments is considered in conjunction with the following drawings, in which:

FIGS. 19 and 20 illustrate assessing fraud in the signature field of a giro;

FIG. 21 is an illustration of assessing fraud in a check;

FIG. 22 is an illustration of assessing fraud in a giro;

FIG. 33 is an illustration of assessing fraud in a check;

FIG. 39 depicts a flow chart of a method for assessing a document;

FIGS. 40a-d illustrate assessing fraud in a giro;

Figure 1:
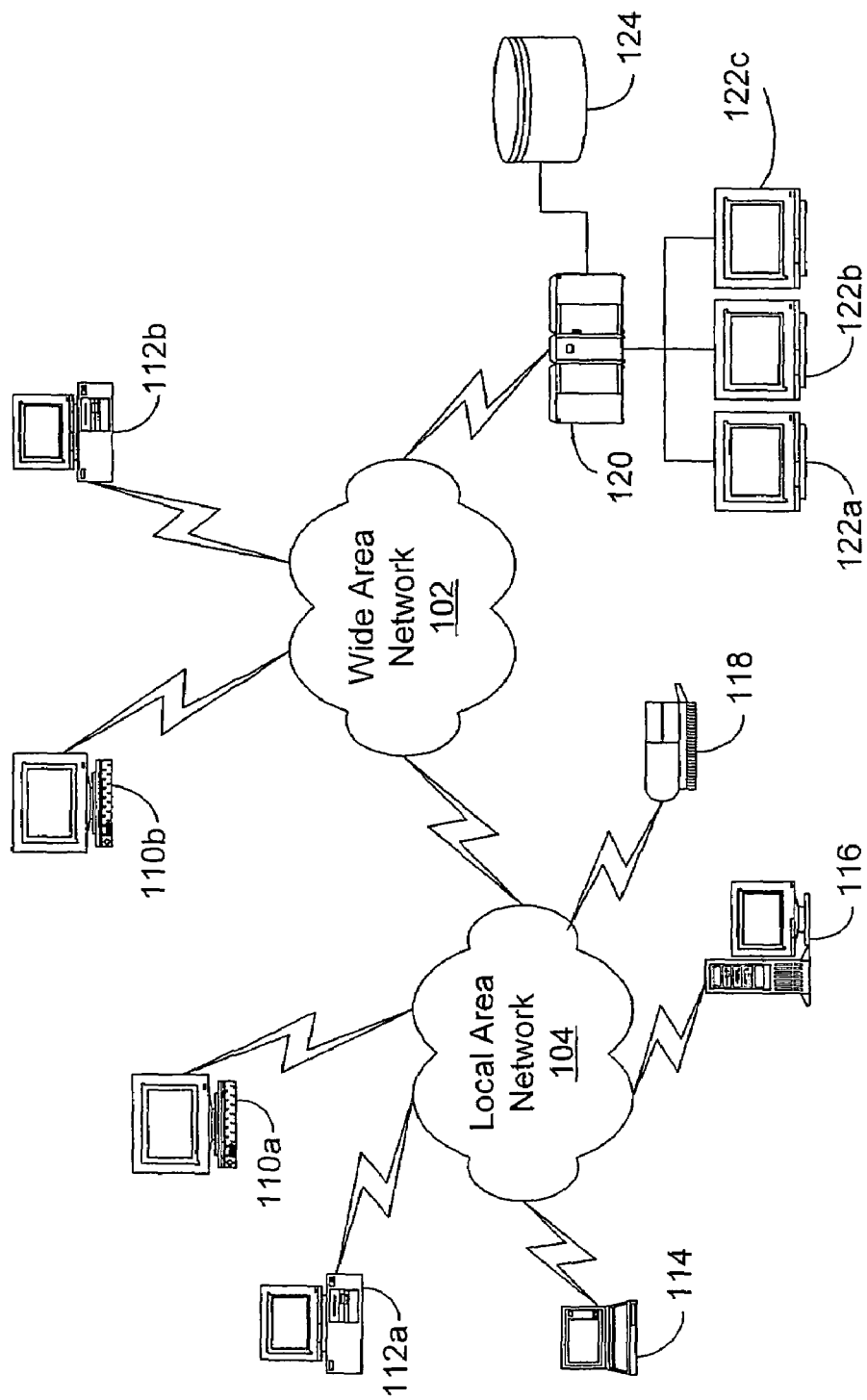
FIG. 1 depicts an embodiment of a network diagram of a wide area network suitable for implementing various embodiments.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF SEVERAL EMBODIMENTS

FIG. 1 illustrates a wide area network ("WAN") according to one embodiment. WAN 102 may be a network that spans a relatively large geographical area. The Internet is an example of WAN 102. WAN 102 typically includes a plurality of computer systems that may be interconnected through one or more networks. Although one particular configuration is shown in FIG. 1, WAN 102 may include a variety of heterogeneous computer systems and networks that may be interconnected in a variety of ways and that may run a variety of software applications.

One or more local area networks ("LANs") 104 may be coupled to WAN 102. LAN 104 may be a network that spans a relatively small area. Typically, LAN 104 may be confined to a single building or group of buildings. Each node (i.e., individual computer system or device) on LAN 104 may have its own CPU with which it may execute programs, and each node may also be able to access data and devices anywhere on LAN 104. LAN 104, thus, may allow many users to share devices (e.g., printers) and data stored on file servers. LAN 104 may be characterized by a variety of types of topology (i.e., the geometric arrangement of devices on the network), of protocols (i.e., the rules and encoding specifications for sending data, and whether the network uses a peer-to-peer or client/server architecture), and of media (e.g., twisted-pair wire, coaxial cables, fiber optic cables, and/or radio waves).

Each LAN 104 may include a plurality of interconnected computer systems and optionally one or more other devices such as one or more workstations 110a, one or more personal computers 112a, one or more laptop or notebook computer systems 114, one or more server computer systems 116, and one or more network printers 118. As illustrated in FIG. 1, an example LAN 104 may include one of each computer systems 110a, 112a, 114, and 116, and one printer 118. LAN 104 may be coupled to other computer systems and/or other devices and/or other LANs 104 through WAN 102.

One or more mainframe computer systems 120 may be coupled to WAN 102. As shown, mainframe 120 may be coupled to a storage device or file server 124 and mainframe terminals 122a, 122b, and 122c. Mainframe terminals 122a, 122b, and 122c may access data stored in the storage device or file server 124 coupled to or included in mainframe computer system 120.

WAN 102 may also include computer systems connected to WAN 102 individually and not through LAN 104 for purposes of example, workstation 110b and personal computer 112b. For example, WAN 102 may include computer systems that may be geographically remote and connected to each other through the Internet.

Figure 2:
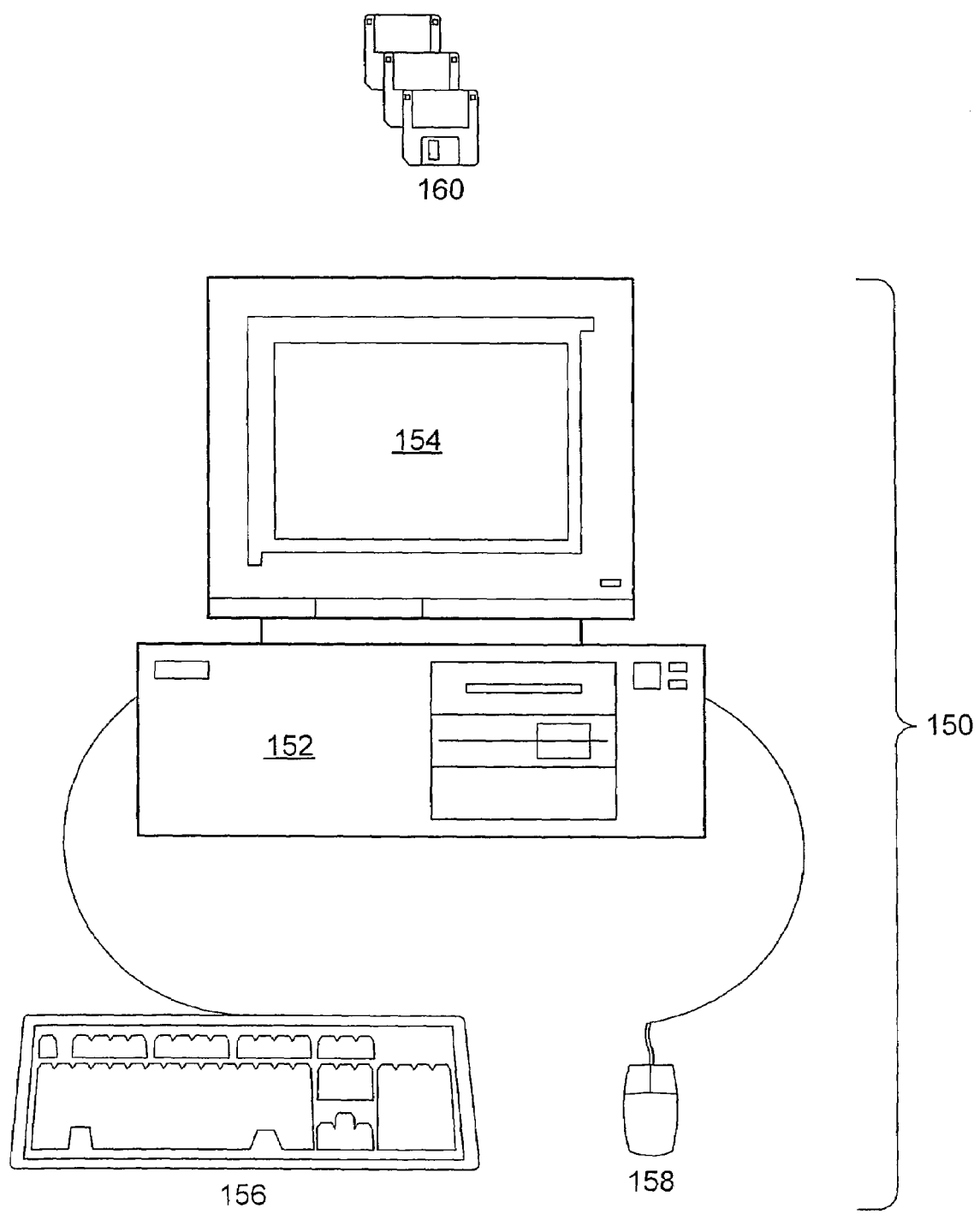
FIG. 2 depicts an embodiment of a computer system suitable for implementing various embodiments.

FIG. 2 illustrates an embodiment of computer system 150 that may be suitable for implementing various embodiments of a system and method for analyzing and assessing documents. Each computer system 150 typically includes components such as CPU 152 with an associated memory medium such as floppy disks 160. The memory medium may store program instructions for computer programs. The program instructions may be executable by CPU 152. Computer system 150 may further include a display device such as monitor 154, an alphanumeric input device such as keyboard 156, and a directional input device such as mouse 158. Computer system 150 may be operable to execute the computer programs to implement computer-implemented systems and methods for analyzing and assessing documents.

Computer system 150 may include a memory medium on which computer programs according to various embodiments may be stored. The term "memory medium" is intended to include an installation medium, e.g., a CD-ROM or floppy disks 160, a computer system memory such as DRAM, SRAM, EDO RAM, Rambus RAM, etc., or a non-volatile memory such as a magnetic media, e.g., a hard drive or optical storage. The memory medium may also include other types of memory or combinations thereof. In addition, the memory medium may be located in a first computer which executes the programs or may be located in a second different computer which connects to the first computer over a network. In the latter instance, the second computer may provide the program instructions to the first computer for execution. Also, computer system 150 may take various forms such as a personal computer system, mainframe computer system, workstation, network appliance, Internet appliance, personal digital assistant ("PDA"), television system or other device. In general, the term "computer system" may refer to any device having a processor that executes instructions from a memory medium.

The memory medium may store a software program or programs operable to implement a method for analyzing and assessing documents. The software program(s) may be implemented in various ways, including, but not limited to, procedure-based techniques, component-based techniques, and/or object-oriented techniques, among others. For example, the software programs may be implemented using ActiveX controls, C++ objects, JavaBeans, Microsoft Foundation Classes ("MFC"), browser-based applications (e.g., Java applets), traditional programs, or other technologies or methodologies, as desired. A CPU such as host CPU 152 executing code and data from the memory medium may include a means for creating and executing the software program or programs according to the embodiments described herein.

Various embodiments may also include receiving or storing instructions and/or data implemented in accordance with the foregoing description upon a carrier medium. Suitable carrier media may include storage media or memory media such as magnetic or optical media, e.g., disk or CD-ROM, as well as signals such as electrical, electromagnetic, or digital signals, may be conveyed via a communication medium such as networks 102 and/or 104 and/or a wireless link.

The systems and methods disclosed herein for analyzing and assessing documents may be applied to various kinds of documents that include handwriting and other machine-printed information. Documents may be analyzed and assessed for fraud or forgery using a profile created for one or more authorized writers of a document. Writers may include individuals, entities, and/or representatives of entities. Writers may also include machines or devices that print writing for individuals or entities. The profile may contain writing characteristics for one or more authorized writers. As used herein, "writing" may refer to, but is not limited to characters and symbols formed by an individual with an instrument (e.g., pen, pencil, stylus, rubber stamp, etc.) and/or formed by a machine (e.g., printer, typewriter, etc). As used herein, "handwriting" may refer to writing done by an individual with a writing implement, in particular, the form of writing peculiar to a particular person. As used herein, "machine-printed writing" may refer to writing formed by a machine. Documents may include, but are not limited to, payment instruments, receipts, securities documents, invoices, account applications, leases, contracts, credit card receipts and slips, loan applications, credit cards, debit cards, school applications, government documents such as social security cards or driver licenses, and legal documents such as wills or divorce decrees. As used herein, "forgery" refers to falsely and fraudulently making or altering a document. A document may be forged with handwriting, a machine, and/or by other means. A forger may make or create an entire document or alter only a portion of a document. For example, a forger may obtain a check of an account owner containing no entries and enter information necessary to obtain a payment. Alternatively, a forger may obtain a check complete with entries of an account owner and alter one or more portions of the check.

For example, payment instruments may include various types of commercial paper such as a draft. As used herein, a "draft" is an order to pay. Generally, a draft involves three parties. One party, the "drawer," orders another party, the drawee (often a bank), to pay money to a third party, the "payee," or to a bearer of the draft. A "check" is any draft drawn on a bank and payable on demand. Alternatively, a payment instrument may include a "giro." A "giro" is a check-like payment instrument commonly used to make payments in many European countries.

In one embodiment, a document may include variable written information and stock characteristics. Stock characteristics refer to pre-printed information that tends not to vary on a particular set of documents. A set of payment instruments for a payment instrument account may include one or more stock characteristics. For example, stock characteristics or pre-printed information may include machine-printed text blocks, graphics elements (e.g., bank logo), and the relative positions and/or locations of other stock characteristics. Machine-printed text blocks may include, for example, the name and address of one or more account owners and account numbers. Alternatively, variable written information or writing refers to writing that tends to vary on a particular set of documents. The content of variable written information may depend on a particular purpose or transaction. For example, for a payment instrument, variable written information may include a payee, courtesy amount, date, etc.

Furthermore, a document may include one or more information fields. In one embodiment, an "information field" may be a portion of a document for entering variable written information. For example, the one or more account owners of a checking account are a set of writers or individuals that may enter written information in various portions of a check. For instance, an account owner may write his or her signature in the signature field of a check corresponding to the account of the account owner. As used herein, an "account" refers to a formal business arrangement providing for regular dealings or services, such as banking, and involving the establishment and maintenance of an account. Written information may be entered into information fields of a check by a machine, such as a printer. In some embodiments, an "information field" may refer to pre-printed information on a document, or a document stock characteristic, such as graphic elements or machine-printed text.

Figure 3:
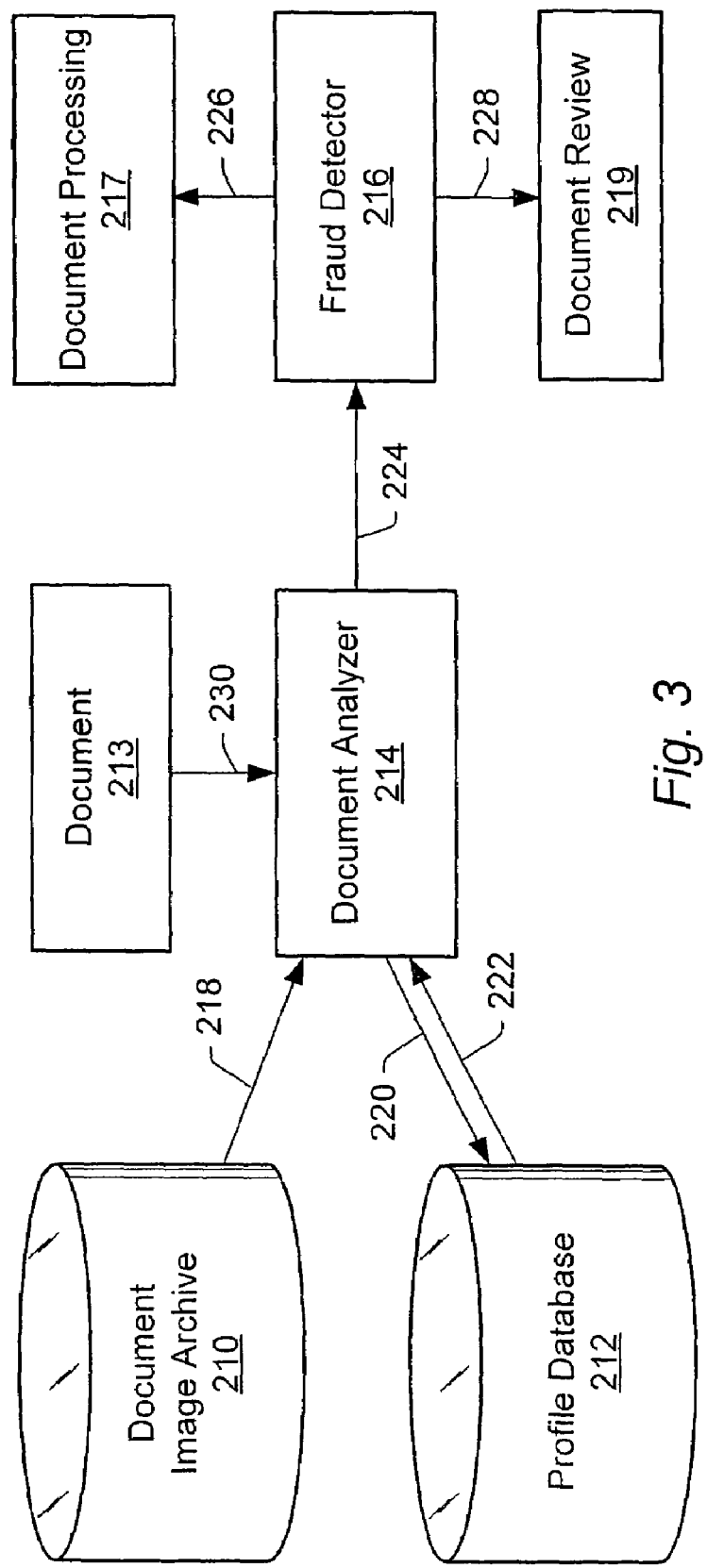
FIG. 3 illustrates an embodiment of a system and method for analyzing documents.

FIG. 3 illustrates an embodiment of a system and method for analyzing and assessing documents. Document image archive 210 may include an archive of images of documents that may include variable written information and/or pre-printed information. The document images may be created from valid processed documents that include valid written information corresponding to known individuals or writers. The document images may also be created from unprocessed and/or forged documents. As used herein, an "image" is a representation of a graphics image in computer memory. The image may be composed of rows and columns of dots. The value of each dot, e.g., whether it is filled in or not, is stored using one or more bits of data. A "bit," short for binary digit, is the smallest unit of information on a computer system.

In one embodiment, document image archive 210 may include a payment instrument archive that includes images of valid processed payment instruments. In some embodiments, the images in the archive may include images of several types of documents corresponding to known individuals or entities. For example, the archive may include images of checks and images of credit card receipts corresponding to a particular individual or individuals or entity. The particular individual or individuals or entity may be authorized writers. "Authorized writers" generally refer to writers permitted and/or with the legal right to make entries on a document, such as one or more account owners of a payment instrument account.

For example, a payment instrument archive may be created and stored by CheckVision software from Computer Sciences Corporation of El Segundo, Calif. A camera may be used to capture digital images of payment instruments. For example, a bank may capture digital images of payment instruments presented for payment. Digital images of payment instruments may be archived for analysis. In one embodiment, the images may be transferred to archive 210 via the Internet. A database of images of any type of document including variable handwritten information, variable machine-printed information, and/or pre-printed information may be created and stored on a memory medium.

As shown by data flow 218, document images from archive 210 may be provided to document analyzer 214. Document analyzer 214 may create a profile that corresponds to the writing of one or more individuals or an entity. The profile may also include pre-pre-printed information. The profile may be created from digital images of previously captured documents in the archive. In one embodiment, document analyzer 214 may be a payment instrument analyzer that creates a payment instrument account profile for an account from images of valid processed payment instruments of an account.

Document analyzer 214 may extract information from one or more images of documents of writers to create the profile. The profile information may include writing characteristics and patterns, data content, semantic patterns, and document layout that uniquely characterize the writers and the document. In one embodiment, the document profile may include profile information from more than one type of document corresponding to known writers. As shown by data flow 220, a profile may be stored in a profile database 212. In one embodiment, profile database 212 may be a payment instrument profile database. In certain embodiments, the database may be stored in memory on a computer system. Alternatively the database may be stored in memory on various types of portable memory media not coupled with a computer system. For example, a memory medium may include a computer chip or magnetic strip. The computer chip or magnetic strip may be coupled with a card (e.g., a credit card, debit card, identification card, etc).

In one embodiment, document 213 may be provided to document analyzer 214, as shown by data flow 230. Document 213 may include one or more information fields that include written and/or pre-printed information. Written information in the one or more information fields may be asserted to have been entered by particular writers. Document 213 may be, for example, an image of a payment instrument that was previously presented for payment to a bank. The writers may include one or more account owners. Alternatively, document 213 may be a bank account application written by an applicant. The writers asserted to have entered written information on document 213 may correspond to a writing profile that is stored on profile database 212. For example, document 213 may be a payment instrument that corresponds to a payment instrument account profile. Document analyzer 214 may perform one or more analyses or tests for assessing fraud on document 213 using a profile from the profile database 212, as shown by data flow 222. A document may be fraudulent if it has been altered, written, or created by an individual other than one of the authorized writers for a document, such as one or more payment instrument account owners. An individual who fraudulently writes, alters, or creates a document may be referred to as a forger of a document. For example, a "forger" of a payment instrument may be an individual who alters or writes a payment instrument of an account not owned by the forger without the permission of one or more of the account owners. In addition, a forger may be an individual who signs a credit card slip corresponding to a credit card account not held by the individual.

The results of the tests or analyses on document 213 may be provided to a fraud detector 216, as indicated by data flow 224. Fraud detector 216 may assess from the tests or analyses whether document 213 is potentially fraudulent. In one embodiment, if document 213 is assessed not to be a forgery, the computer system may notify a document processing system 217 that the document is valid, as indicated by data flow 226. Alternatively, fraud detector 216 may assess that document 213 is potentially fraudulent. In this case, document 213 may be submitted, as indicated by data flow 228, for further review 219. The result of document review 219 may be sent to document processing 217. For example, a reviewer may determine that a payment instrument is fraudulent and instruct the bank not to make payment. The determination of whether the payment instrument is fraudulent may involve further research. For example, a reviewer may contact the account owner corresponding to the payment instrument. Rejected payment instruments may be returned to depositors.

In an alternative embodiment, document analyzer 214 may extract information from document 213 for purposes other than assessing fraud. For example, text from document may be recognized and extracted to save labor that would be expended in keying in the text. In addition, information may be extracted from document 213 and stored in profile database 212.

Furthermore, the information in the profile may be used for data mining. Data mining refers to the process of looking for hidden patterns in a group of data. Data mining may be used to find correlations between information fields to predict the content of, for example, a payment instrument presented for payment. For instance, data mining may be able to predict an entry in one information field of a document based on the entry in another.

In one embodiment, a profile may include specific information relating to one or more information fields of a document. The specific information corresponding to each information field is generally entered in writing by the writer of the document. Detection of handwriting in an information field of a document belonging to someone other than an authorized writer is evidence of potential fraud. For example, handwriting in any information field of a payment instrument belonging to someone other than one of the account owners is evidence of fraud.

Figure 4:
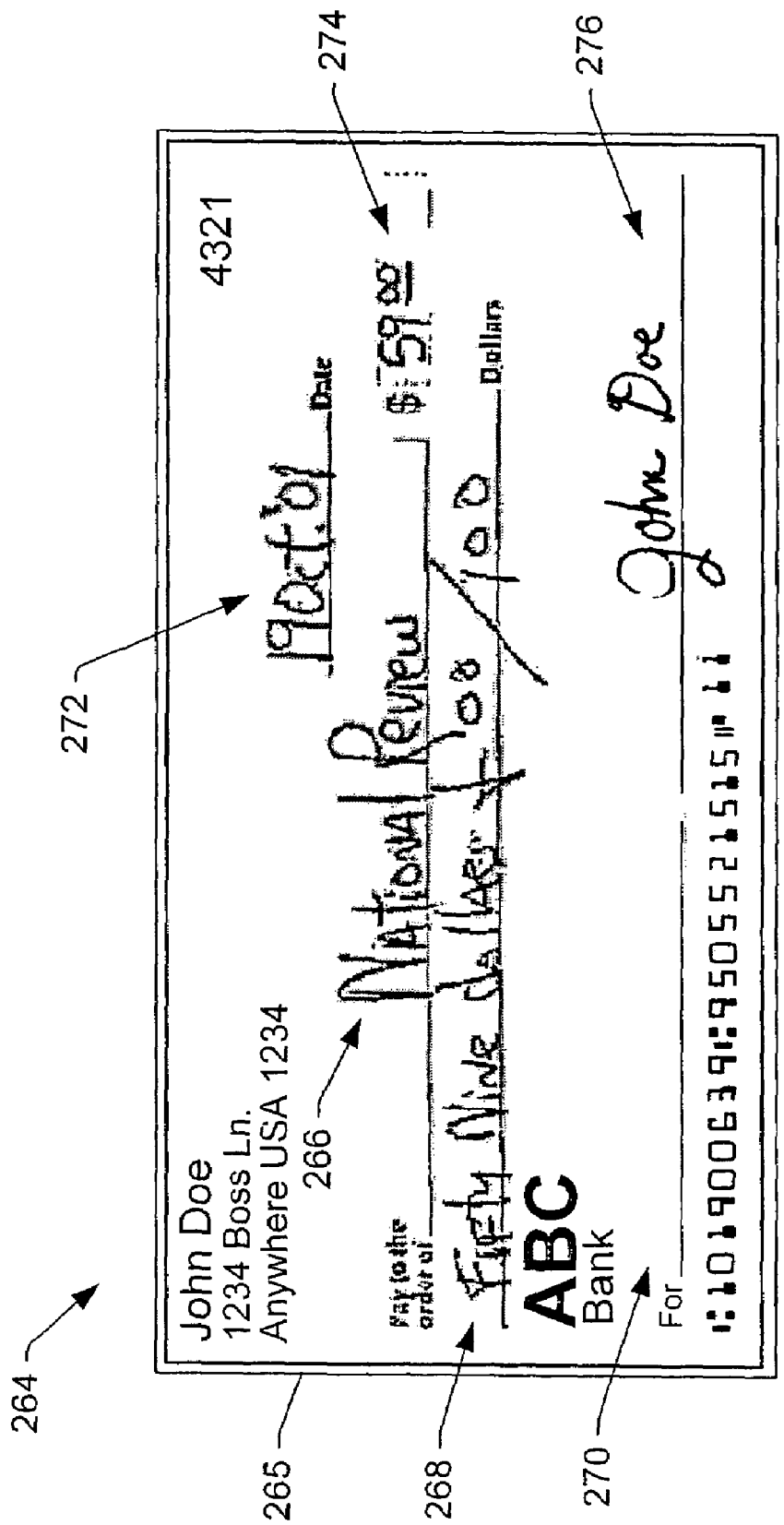
FIG. 4 depicts an illustration of a check.

FIG. 4 depicts an illustration of a check that includes handwritten information in the information fields of the check. Check 264 includes payee field 266, date field 272, courtesy amount field 274, legal amount field 268, memo field 270, and signature field 276. Payee field 266 generally includes the name of an individual or entity. Date field 272 may include a date after which the check may be paid in terms of a month, day, and year. Courtesy amount field 274 may include the amount, for example, in dollars, in numeric form for which the check is written. Legal amount field 268 may include the amount in dollars in alphanumeric form for which the check is written. Memo field 270 may include any information a writer of the check may desire to enter. A writer may enter information in the memo field relating to the purpose of the payment, for example, "June Rent." A writer may also enter an account number that corresponds to an account the writer has with a payee. For example, a writer may enter a writer's account number with a utility company or a writer's credit card account number. Signature field 276 includes the handwritten signature of one of the owners of the account. As used herein, a "signature" may be defined as the name of a person written with the person's own hand. Label 265 refers to the stock characteristics and/or pre-printed information of the check.

Figure 5:
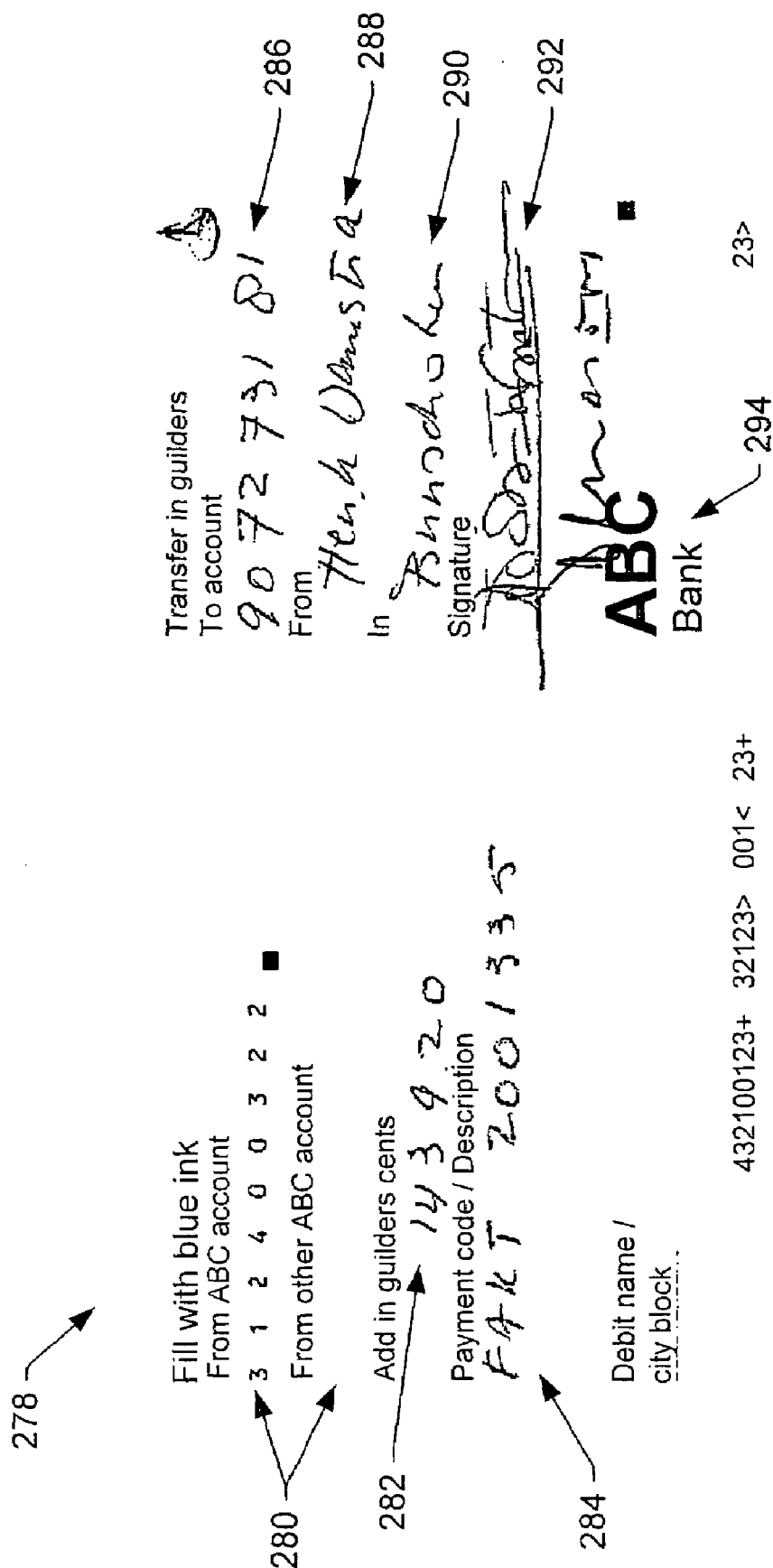
FIG. 5 depicts an illustration of a giro.

FIG. 5 depicts an illustration of a giro that includes handwritten information in information fields of the giro. Giro 278 includes debit account fields 280, amount field 282, description field 284, credit account field 286, name field 288, city field 290, and signature field 292. Giro 278 also includes text 294. Debit account field 280 includes the number of an account to be debited or charged against to pay the amount for which the giro is written. Amount field 282 may include the amount, for example in euros, in numeric form for which the giro is written. Description field 284, like the memo field, may include any information a writer of the giro may desire to enter. Credit account field 286 includes the number of an account to be credited in the amount for which the giro is written. Name field 288 includes the payee of the giro. City field 290 includes the name of the city where the giro credit recipient's bank is located. Signature field 292 includes a signature of one of the giro account owners.

In one embodiment, a writing profile, such as a payment instrument account profile, may include profiles for one or more of the information fields in a document. The profile of the information fields may include writing characteristics and patterns, data content, and/or semantic patterns that uniquely characterize the writing entered into information fields by particular writers. An information field of a document, such as a payment instrument, may include one or more entry types that the writer of the document may enter in the information field. An entry type refers, for example, to a specific name or number that one or more owners of an account enter in a field. For instance, entry types of a payee field correspond to payee names to which account owners write checks.

In an embodiment, a writing profile for a document, such as a payment instrument account profile, of an entry type of an information field may include one or more representations of the entry type. The one or more representations may be referred to as writing profile representations. Writing profile representations may include handwriting profile representations and machine-printed profile representations. An embodiment of a method of generating a payment instrument account profile for an account may include providing one or more payment instruments written by one or more account owners. At least one of the payment instruments may include at least one information field. In one embodiment, images of the writing in at least one information field may be obtained. The payment instrument images may be obtained from the image archive discussed in FIG. 3. The method may further include determining at least one profile representation of from at least one of the information fields.

At least one of the writing profile representations may correspond to at least one entry type of at least one of the information fields. At least one variant of the written entry type of an information field may be included in the handwriting profile representations.

A "variant" refers to a distinct written sample of a type of written information such as a character or set of characters. A type of written information may be, for example, a letter of an alphabet or a signature. Generally, writing of an writer, such as an individual, includes writing characteristics and patterns, data content, and/or semantic patterns that are unique to the writer. A single sample of an individual's handwriting, for example, may not include all the unique properties of the handwriting of an individual. A single variant includes at least some of such properties. Variants of a particular type of written information, such as a signature, may include a majority of the writing characteristics and patterns, data content, and/or semantic patterns that are unique to the individual. For example, an individual may consistently include a set of strokes in his or her signature. However, the individual may not include all such strokes in every signature sample.

Figure 6:
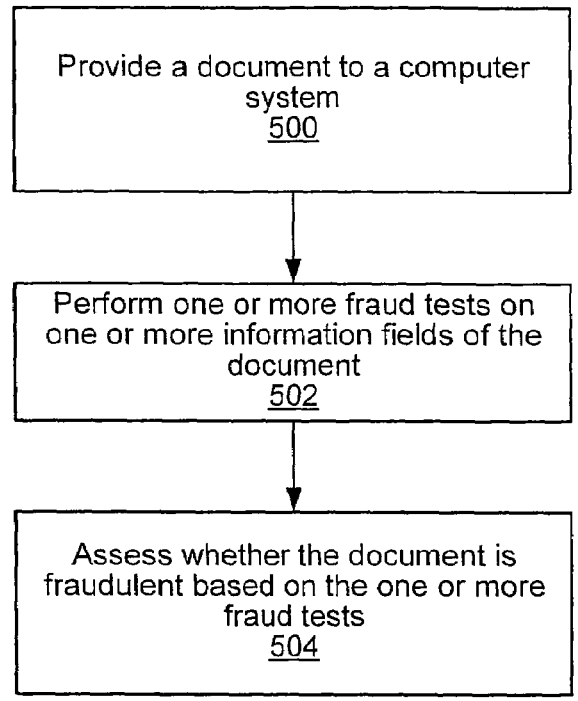
FIG. 6 depicts a flow chart of a method for assessing fraud in documents.

Furthermore, a method of assessing fraud in a document, such as a payment instrument, may include performing one or more fraud tests. A document may be fraudulent if at least some of the writing on the document was not entered by authorized writers permitted to make entries on a document, such as one or more account owners of a payment instrument account. A document may also be fraudulent if at least some of the pre-printed information on the document does not approximately match the pre-printed information in a pre-printed information profile. Fraud tests may include analyses of writing characteristics and patterns, data content, and/or semantic patterns of entries in individual information fields and between information fields of a document such as a payment instrument. FIG. 6 depicts a flow chart of a method for assessing fraud in a document. Assessing fraud in a document may include providing a document to computer system, as shown at step 500. Fraud tests may then be performed, as indicated at step 502, on one or more of the information fields of the document. At step 504, the method may include assessing whether the payment instrument is potentially fraudulent based on the results of the one or more fraud tests.

In an embodiment, a fraud test may include an assessment of whether information in an information field of the document approximately matches a writing profile or pre-pre-printed information profile (or payment instrument account profile) of the information field. Failure of information in an information field to approximately match a writing profile may be evidence that the information was not made by at least one of the authorized writers permitted to make entries on the document (such as an account owner of a payment instrument account). Matching information in an information field with a profile may refer to comparing the information as a whole to the profile. Matching an information may also refer to comparing discrete elements or characteristics of the information to the profile. Therefore, matching may include a subset of several fraud tests. In one embodiment, a fraud test may include analyzing variations among discrete elements in information in an information field. Similarly, a fraud test may include analyzing a comparison of information in different information fields. Another fraud test may include analyzing correlations of information in different information fields. In addition, a fraud test may include assessing whether information in an information field approximately matches a lexicon associated with the information field.

The result of the fraud tests may provide evidence that a document, such as a payment instrument, is potentially fraudulent. The strength of the indication of fraud may be different for each fraud test. In one embodiment, one or more of the fraud tests may be assigned a fraud weight, such that the fraud weight corresponds to the strength of the indication of fraud in the payment instrument. An assessment of whether a document, such as a payment instrument, is fraudulent may be based on one or more of the fraud tests and the corresponding fraud weights. The assessment may be made in the fraud detector depicted in FIG. 3.

In an embodiment, when a fraud test indicates fraud, the computer system may generate a flag indicating that the document is potentially fraudulent. The flag may include a fraud weight that corresponds to a strength of the indication of fraud of the fraud test. The fraud weight of a fraud test may depend on a number of factors. For example, fraud tests involving features that are consistently present in certain documents, such as payment instruments of an account, may receive a greater weight than fraud tests involving features present less frequently. For example, variations in writing features that are always present may receive a higher weight than variations in features that are infrequently present. In addition, fraud tests involving fields where fraud is frequently perpetrated in payment instruments, such as a courtesy amount field and a legal amount field, may receive a higher weight than fraud tests relating to other information fields.

TABLE 1

Summary of Content in a Document Profile and Corresponding Analysis Techniques.

| Profile Component | Content | Analysis Technique |
|---|---|---|
| Information Field Content Shape | Mathematical representations for variants of types of written information | Information Field Content Shape Analysis |
| Information Field Content Image | Images for variants of types of written information | Information Field Content Image Analysis |
| Digit/Alpha | Mathematical representations for variants of a letter type and a numeral type | Digit/Alpha Analysis |
| Symbology | Mathematical representations for variants of a symbol type Images for variants of a symbol type | Symbology Analysis |
| Syntax Pattern | Elements and ordering of elements in specific information fields | Syntax Pattern Analysis |
| Lexicon | List of the names that have previously been recognized on documents associated with a set of individuals and/or accounts | Lexicon Analysis |
| Document Stock or Pre-printed Information | Representation of the nature and location of the graphic elements and machine-printed text that appear on a document associated with a set of individuals and/or accounts Mathematical representations for variants of types of pre-printed information, including font type, information Images for variants of types of machine-printed information, including font type | Document Analysis |
| Information Field Cross Correlation | Table listing the cross field relationships of interest in a document associated with a set of individuals | Cross Field Matching Analysis |

Table 1 provides a summary of components of content (i.e., variable writing and pre-printed information) in a document profile, such as a payment instrument account profile, and analysis techniques according to one embodiment. The analysis techniques may be applied to the corresponding profile contents to assess fraud in a document such as a payment instrument. The information field content shape profile may include mathematical representations for variants of types of written information. The information field content image profile may include images for the variants of types of written information. The writing profiles may include representations of at least one font style of machine-printed writing. The digit/alpha profile may include both mathematical representations and images for the variants of characters such as letters and numerals. The symbology profile may include mathematical representations and images of variants of symbols that appear in the information field of a document such as a payment instrument (e.g., a '+' in the legal amount field). The syntax pattern profile may include a list with elements and an order of the elements in specific information fields. For example, a syntax pattern profile may include the variants of the form of a month, day, year, and punctuation and the order of the month, day, and year and punctuation in the date field. In addition, the lexicon profile may include a list of names that have previously been recognized for an account in a particular information field, such as payee names in a payee field. The document stock or pre-printed profile may include representations of pre-printed information such as graphic elements (e.g., bank logos) and machine-printed text (e.g., name and address of account owners) that appear on a document, such as a payment instrument. The document stock profile may also include mathematical representations and/or images of machine-printed text. The information field cross correlation profile may include a list of cross field relationships that may occur with a particular frequency in a document associated with particular writers, such as in a payment instrument of an account. For example cross field relationships may include: account number in a memo field to payee name, payee name to legal and courtesy amount, and identity of check writer from the signature field to syntax patterns and symbology in other fields.

Handwriting and/or writing may include, but is not limited to a mathematical representation and/or an image. Handwriting and/or writing may also include, but is not limited to at least one type of handwritten and/or written information such as a word type and/or character type. Handwriting and/or writing may further include, but is not limited to a global feature of handwriting and/or writing, a local feature of handwriting and/or writing, a syntax pattern, and/or a lexicon name for an information field. A handwriting and/or writing profile representation may include, but is not limited to at least one of the types of handwriting and/or writing profiles described in Table 1.

TABLE 2

Summary of Content Analysis for Payment Instrument.

| Information Field | Content Analysis |
|---|---|
| Pre-printed information | Matching of all preprinted information including machine-printed text, logos, line and other graphic elements Font Matching |
| Courtesy Amount | Individual character analysis Character patterns surrounding the courtesy amount Symbology used in writing the cents amount |
| Legal Line—Dollar Amount | Global handwriting features Word matching Individual character analysis Symbology connecting the dollar and cent content Character patterns surrounding the legal amount |
| Legal Line—Cents Amount | Punctuation Individual digits |
| Payee | Global writing features |

TABLE 2-continued

Summary of Content Analysis for Payment Instrument.

| Information Field | Content Analysis |
|---|---|
| | Words |
| | Individual characters |
| | Lexicon matching to generic lists of payees (e.g., common payees) |
| | Lexicon matching to suspicious payees (payee names frequently involved in transactions with high fraud risk) |
| | Matching to ASCII list of payees common for the account |
| | Matching to handwriting of payees common for the account |
| Signature | Global writing characteristics |
| | Word matching |
| Memo | Global writing characteristics |
| | Individual character analysis |
| Date | Patterns |
| | Individual character analysis |
| Endorsement | Matching of endorsement to payee |

Table 2 describes a summary of various embodiments of analysis for information fields of a payment instrument. The profiles described in Table 1 may be applied to assess a payment instrument using the analysis summarized in Table 2.

Profile representations of variable writing and pre-printed information (e.g., machine-printed text) may be stored in memory on a computer system in terms of mathematical representations. In an embodiment, a writing profile, such as a payment instrument account profile, may include one or more mathematical representations of variable writing and/or pre-printed information. The mathematical representations may include one or more variants of an entry type of an information field. As noted above, a variant refers to a distinct version of a type of written information. For example, the appearance of a handwritten signature of an individual, such as an account owner, may tend to vary, even within a short time period. The account owner may have several distinct versions of his or her signature. The one or more mathematical representations in a signature profile for an account owner correspond to one or more of the variants of the signature. In other embodiments, a writing profile, such as a payment instrument account profile, in memory on a computer system may include one or more images. In a similar manner, one or more of the images may include images of one or more variants of an entry type of an information field.

In one embodiment, mathematical representations of writing may be expressed as feature vectors. For example, U.S. Pat. No. 6,157,731 to Hu et al., U.S. Pat. No. 6,084,985 to Dolfing et al., U.S. Pat. No. 5,995,953 to Rindtorff et al., U.S. Pat. No. 5,828,772 to Kashi et al., and U.S. Pat. No. 5,680,470 to Moussa et al., which are incorporated by reference as if fully set forth herein, disclose the use of feature vectors to represent handwriting. Feature vectors are vectors that may include one or more writing features that characterize writing as elements of the vectors. For example, features included in a feature vector may represent the strokes that make up written information. Since writing has a local character and a global character, both local features and global features may characterize writing. Global features describe general characteristics of writing. Consequently, global features may be discernible in all information fields of a document such as a payment instrument. Global features in a profile for an information field may be the result of combining global features from written information in several information fields. Global features may include global slant, tangent entropy, global thickness of stroke (pen thickness), and curvature entropy.

"Entropy" refers to a way of measuring information content. Something that is very predictable has an entropy of zero, while something having little or no predictability, has maximum entropy. The more predictable writing appears, the lower its entropy. Handwriting strokes may be parallel or may have several directions. Handwriting that is predictable may be composed of strokes in relatively regular patterns. On the other hand, a signature with many vertical and horizontal strokes may have higher entropy.

Curvature versus tangent entropy refer to a measure of changes in curves and stroke directions, respectively. The style of writers may be classified according to their entropies. The entropy, H(i), of stroke i may be calculated by $H(i) = -p_i \log(p_i)$, where $p_i$ is the probability of stroke i.

Local features refer to characteristics specific to a particular writing sample. Local features may include local slant, leading and trailing tail shape and direction, topology of a digit, stroke distribution (e.g., proximity of strokes, height, width), local thickness of stroke (to evaluate shakiness in handwriting), alpha versus numeric patterns (e.g., date), punctuation, symbols, '00' shape in amounts, and 'xx/100' structures in the legal amount.

Furthermore, topological vectors may represent the relationship between strokes. The topological vectors may include information about the location of strokes with respect to one another, for example, tangent and direction vectors.

In an embodiment, one or more of the variants of types of written information of an information field of a writing profile may include a majority of the features that characterize the writing of authorized writers, such as one or more account owners. Stable features refer to features that tend to appear consistently in writing in different samples of a writer. Stable features may tend to be more significant in fraud assessment and recognition than weak features. Weak features refer to features that tend not to appear consistently in writing samples. Furthermore, writing in the information fields of a document, such as a check or giro, may be converted into a mathematical representation.

Figure 7:
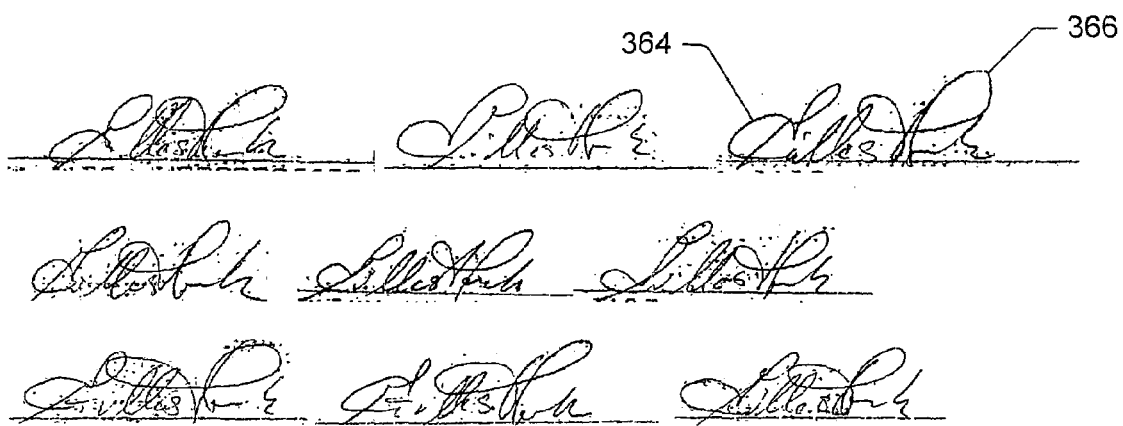
FIG. 7 illustrates writing features included in mathematical representations of writing.
Figure 8:
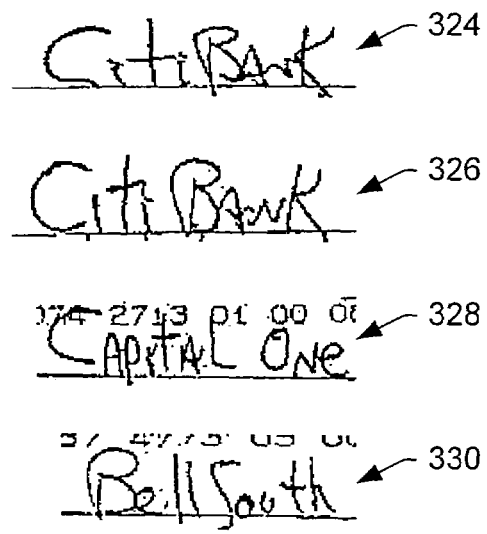
FIG. 8 illustrates writing features included in mathematical representations of writing.
Figure 9:
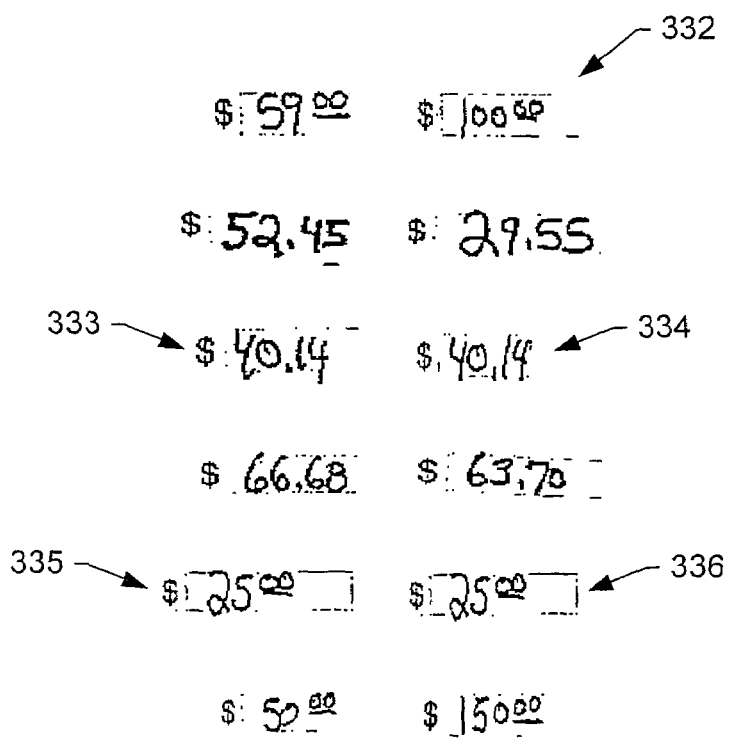
FIG. 9 illustrates writing features included in mathematical representations of writing.
Figures 10, 11:
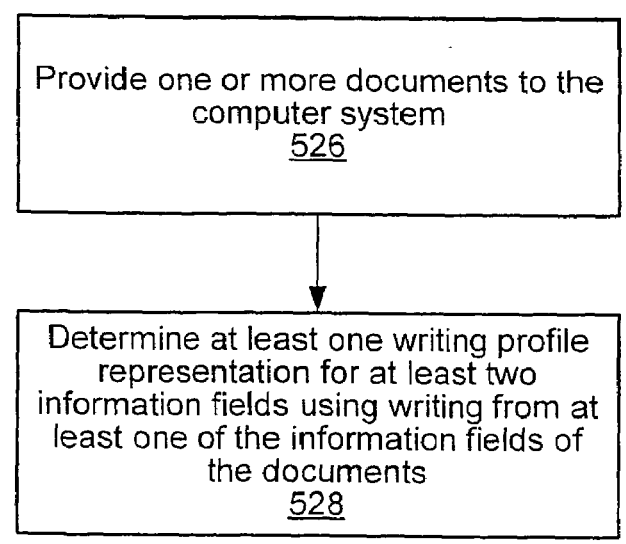
FIG. 10 illustrates legal amount entries in a legal amount field.
FIG. 11 depicts a flow chart of a method of generating a writing profile.

FIGS. 7, 8, 9, and 10 illustrate features that may be included in mathematical representations of information or entries in information fields of a payment instrument. FIG. 7 represents nine variations of a signature entry in a signature field. Although some variation exists in the signature entries, bottom left stroke 364 and top right stroke 366 are consistently present. Such features may be considered to be stable features. FIG. 8 represents entries from a payee field. Several characteristics are consistent in each of entries 324-330. For example, the characters tend to be upright with block letters. Also, the character shapes, such as that of the 'C', are consistent. FIG. 9 represents entries from a courtesy amount field. The courtesy amount entries also exhibit several consistent features. These include the cents '00' and non '00' features, as shown by entries 332 and 334. Digit shapes are also consistent, for example, the '4's, as shown by entries 333 and 334 and the '2's, as shown by entries 335 and 336. FIG. 10 represents legal amount entries in a legal amount field. The legal amount entries include dollar amount 348, symbol ('+') 350, and symbol ('xx/100') 349. The dollar amount and symbols are consistent among the various entries.

An embodiment of a method of generating a writing profile for information fields of a document is depicted by a flow chart in FIG. 11. In an embodiment, one or more of the documents may be a payment instrument. The information fields may include handwriting of one or more account owners of a payment instrument account. The method may include providing one or more documents to the computer system, as shown in step 526 of FIG. 11. In one embodiment, at least one of the documents may include at least one information field. In other embodiments, at least one of the documents may include at least two information fields. One or more of the documents may be provided by accessing at least one image from a database in memory on a computer system. At least one of the documents may be a valid document. In certain embodiments, the method may include obtaining images of writing in the information fields. The method may further include determining at least one writing profile representation for at least two information fields, as shown in step 528. Determining at least one writing profile representation may use writing from at least one of the information fields of the documents. At least one of the writing profile representations may be stored on a memory medium on a computer system.

In an embodiment, at least one writing profile representation may be assessed for at least two of the information fields using writing from at least one of the information fields. Alternatively, at least two writing profile representations may be assessed. In some embodiments, writing may be used from at least two information fields.

In other embodiments, at least two writing profile representations may be assessed for at least one of the information fields using writing from at least one of the information fields. Alternatively, at least two writing profile representations may be assessed for at least one of the information fields. In some embodiments, writing may be used from at least two information fields.

In some embodiments, at least one writing profile representation may be assessed for at least one of the information fields using handwriting from at least two of the information fields. Alternatively, at least two writing profile representations may be assessed. In another embodiment, at least one writing profile representation may be assessed for at least two of the information fields. Some embodiments may further include determining at least two writing profile representations for at least two of the information fields using writing from at least two information fields.

The method may further include determining mathematical representations of writing in one or more of the information fields. In some embodiments, determining mathematical representations of writing may involve converting images of writing in at least one of the information fields to mathematical representations.

At least one of the writing profile representations may include mathematical representations of the writing in the information fields. In an embodiment, determining writing profile representations may involve determining variants of the mathematical representations of writing. In an embodiment, at least one writing profile representation may include at least one writing variation (variant) of an example of at least one type of written information. For example, profile representations, belonging to the Digit/Alpha profile described in Table 1, may include variants of the handwritten letter "a." The writing profile representations may also include variants of one or more entry types in the one or more information fields. In an embodiment, at least one of the writing profile representations may be an image. In other embodiments, at least one of the writing profile representations may be a mathematical representation.

The conversion of an image to a mathematical representation expressed as feature vectors is disclosed in U.S. Pat. No. 6,157,731 to Hu et al., U.S. Pat. No. 6,084,985 to Dolfing et al., U.S. Pat. No. 5,995,953 to Rindtorff et al., U.S. Pat. No. 5,828,772 to Kashi et al., and U.S. Pat. No. 5,680,470 to Moussa et al., which are incorporated by reference as if fully set forth herein. For example, one method may include first converting an image to a runlen image. A "runlen image" refers to a raster scan image that is represented by black (where the text is) and white runs (where the background is). A runlen image has N lines (in a raster scan) and each line is represented by a variable number of runs (white-black-white-black- . . . ). A run may be represented by a start point and its length. The runlen image may then be converted to a Freeman chain code. A "Freeman chain code" is an image representation that has an 8-direction code that provides a contour of an object in an image, for example, a letter. The Freeman chain code may then be converted to a tangent, which may be converted to curvature. The curvature may then be converted to a handwriting or writing stroke.

In an embodiment, one or more variants among the mathematical representations may be assessed using a clustering algorithm. Clustering algorithms are methods of grouping large sets of data into clusters of smaller sets of similar data. The goal of a clustering algorithm is to reduce an amount of data by categorizing or grouping similar data items together into a "cluster." A clustering algorithm finds natural groups of components (or data) based on some similarity. In particular, a clustering algorithm may determine groups of mathematical representations based on similarity of writing features. The clustering algorithms that assess the variants of a type of written information may use curvature and tangent profile matching (entropy measure), dynamic warping/matching, and K-nearest neighbor techniques.

Figure 12:
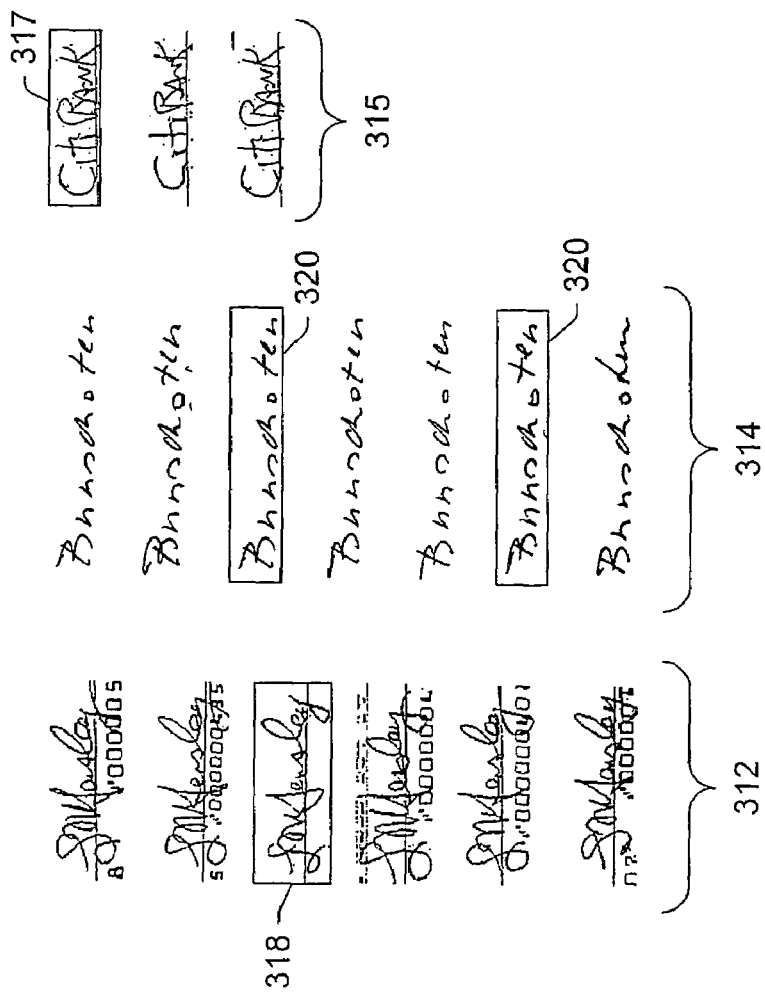
FIG. 12 illustrates determining a handwriting profile from handwriting samples.

FIG. 12 is an illustration of determining variants for a handwriting profile from handwriting samples. Handwriting samples 312 depict six different samples of a signature from the signature field of a check. The signature samples are very consistent with little variation from one sample to another. Therefore, only one variant may be assessed to characterize the signature of the account holder (e.g., variant 318). Handwriting samples 314 depict seven samples from the city field of a giro. There is also little variation in the samples of the city name. In this case, variant 320 may be assessed to characterize the city name. In addition, handwriting samples 315 depict samples of the payee line of a check. A small amount of variation is exhibited between the samples. Variant 317 may be assessed to characterize the samples. Handwriting samples 316 depict seven samples of a legal amount from a check. In this case, there are three entry types with respect to the dollar amount: four samples with "one hundred dollars" and one sample each for "two," "three," and "four hundred dollars." Only one variant of the "one hundred dollars" samples may be necessary.

As described herein, a writing profile may be assessed from more than one sample of writing, as shown in FIG. 12. It is advantageous to base a writing profile on more than one sample due to variations in writing of the authorized writers. A greater variation in writing of the authorized writers may require a greater number of samples to characterize the writing with a writing profile.

Figure 13:
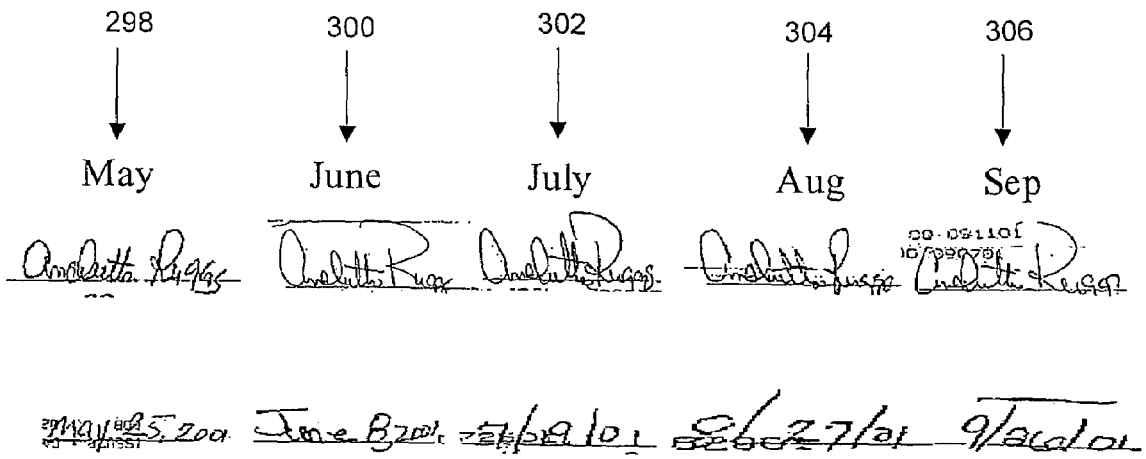
FIG. 13 illustrates dynamic variation of handwriting.

Variation in handwriting may be both inherent and dynamic. Dynamic variation refers to the change in an individual's handwriting over time, for example, over months and years. For example, the variation of a date from a date field and a signature from checks written over a period of months is illustrated in FIG. 13. Samples 298, 300, 302, 304, and 306 represent a variation from May to September of the year 2001. In this case, the dynamic variation for both the date and the signature is apparent. The appearance of the signature varies between May and September. In addition, there is a change in the syntax of the date field from an alphabetic month to a numeric month between May and September.

Inherent variations refer to variations in handwriting that are independent of time or that may occur over a short period of time, for example, over days. The source of inherent variations may be inconsistent handwriting of an individual. For instance, an individual may consistently write a signature two or more ways.

Figure 14:
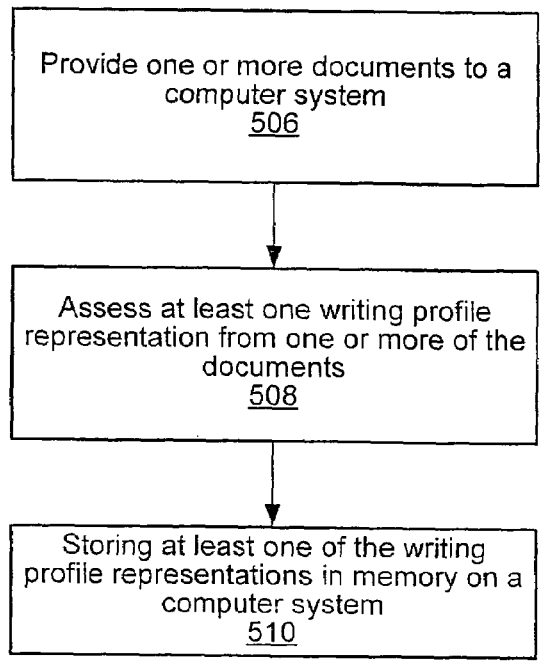
FIG. 14 depicts a flow chart of a method of generating a writing profile from images in a computer database.

In one embodiment, a method of generating a handwriting profile, such as a payment instrument account profile that takes into account inherent variations is depicted in FIG. 14. In step 506, one or more documents may be provided to a computer system. The documents may be provided from a database corresponding to a document archive shown in FIG. 3. The documents may be valid documents submitted by authorized writers. The documents may take into account variations in the handwriting of the authorized writers only up to the date of the latest submitted document in the database. At least one handwriting profile representation may be assessed from one or more of the documents, as shown in step 508. The handwriting profile representations may be, for example, images and/or mathematical representations. One or more of the handwriting profile representations may then be stored in memory on a computer system, as shown in step 510. Alternatively, at least one of the handwriting profile representations may be stored on various types of portable memory media not coupled with a computer system. For example, the handwriting profile representations may be stored in a handwriting profile database depicted in FIG. 3.

Figure 15:
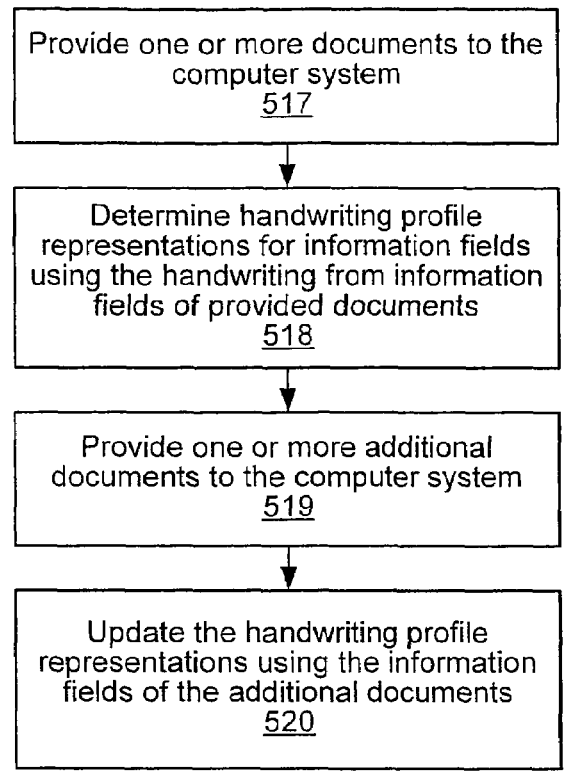
FIG. 15 depicts a flow chart of a method of generating a writing profile from images presented for processing.

In an embodiment, a method of generating a handwriting profile on a computer system that accounts for dynamic variations in handwriting is depicted in FIG. 15. As shown in step 517, the method may include providing one or more documents to the computer system. At least one of the documents may include at least one information field. In some embodiments, the documents may include at least two information fields. At least one of the documents may be a valid document, such as a validated payment instrument. In an embodiment, the one or more documents may be provided to the computer system by providing images of the document to the computer system. At least one handwriting profile representation may be assessed for at least two of the information fields using the handwriting from at least one of the information fields, as indicated at step 518. Alternatively, at least one handwriting profile representation may be assessed for at least one of the information fields using the handwriting from at least two of the information fields. In other embodiments, at least two handwriting profile representations may be assessed for at least one of the information fields using the handwriting from at least one of the information fields. In an embodiment, the handwriting profile representations may be stored on a memory medium on a computer system.

In some embodiments, the method may further include providing one or more additional documents to the computer system, a shown by step 519. At least one of the additional documents may include at least one information field. At step 521, the method may include updating at least one of the handwriting profile representations using at least one of the information fields of at least one of the additional documents. Alternatively, updating may also use at least one of the information fields of at least one of the documents. In certain embodiments, updating at least one of the handwriting profile representations may include modifying at least one handwriting profile representation, deleting at least one handwriting profile representation, and/or determining at least one handwriting profile representation.

The additional documents may be payment instruments presented for payment to a bank that have been validated. The computer system memory may then be updated with the handwriting profile representations obtained from the additional documents. Consequently, the profile may be periodically updated to take into account the dynamic variation of the handwriting of the one or more account owners.

A writing profile, such as a payment instrument account profile, as described herein, may be applied to assess fraud in documents, such as payment instruments presented for payment to a bank. Methods for assessing fraud in a document, such as a payment instrument, may require methods for recognizing characters or text on a document. "Recognizing," as used herein, refers to the process of identifying elements of written information, such as numerals, letters, and symbols, from a representation of the characters. The representation may be an image or mathematical representation, for example. Elements of written information may be identified from mathematical representations from feature vectors.

Written information in an image representation may be identified by converting the image into a computer processable format, such as ASCII. "ASCII" is an acronym for the "American Standard Code for Information Interchange." ASCII is a code for representing English characters as numbers, with each letter assigned a number from 0 to 127. Most computer systems use ASCII codes to represent text to enable transfer of data from one computer to another.

Several products are commercially available for recognition of written information in images. For example, Checkscript and Quickstrokes are character recognition software products from Mitek Systems of San Diego, Calif. In addition, Checkplus 2.0 is character recognition software provided by Parascript of Niwot, Colo. A2iA of New York, N.Y. provides CheckReader™. The Corroborative Image Character Recognition (CICR) System may be obtained from Computer Sciences Corporation of El Segundo Calif. Gaussian Probabilistic Distribution (GPD) software may be obtained from Malayappan Shridhar of the School of Engineering at the University of Michigan at Dearborn, Dearborn, Mich.

In one embodiment, the information field content shape profile, referred to in Table 1, may include at least one mathematical representation of writing on a computer system. At least one of the mathematical representations may represent writing of authorized writers, such as one or more account owners. In an embodiment, mathematical representations may include one or more entry types of an information field of a document. The mathematical representations characterize writing of the authorized writers. The mathematical representations may be represented in terms of feature vectors, as described herein. In an embodiment, at least one of the mathematical representations may include at least one variant of an entry type of an information field.

According to one embodiment, an information field content shape profile may be generated for any information field of a document that includes writing. For example, information field content shape profiles of a checking account (see FIG. 4) may be generated for payee names of a payee field, dates in a date field, amounts in a courtesy amount field, amounts in a legal amount field, descriptions in a memo field, and a signature in a signature field. Additionally, information field content shape profiles of a giro account (See FIG. 5) may be generated for account numbers in a debit account field, amounts in an amount field, descriptions in a description field, account numbers in a credit account field, names in a name field, city names in a city field, and signatures in a signature field.

Fraud may be assessed in a document by comparing written information in an information field of the document to a writing profile, such as a payment instrument account profile. According to one embodiment, a method of comparing written information to a writing profile using a computer system may include providing the written information from a document to the computer system. The written information may be in the form of a mathematical representation that includes one or more sample features. Furthermore, at least one writing profile representation may be stored in memory on a memory medium. At least one writing profile representation may include at least one mathematical representation. At least one mathematical representation may include one or more profile features. In an embodiment, the sample features and the profile features may include both global features and local features.

The method may further include assessing non-matching features from a comparison of the sample features and profile features. In some embodiments, the non-matching features may be associated with fraud weights.

"Match" refers to a degree of similarity between samples of written information. For example, U.S. Pat. No. 5,995,953 to Rindtorff et al., U.S. Pat. No. 5,828,772 to Kashi et al., and U.S. Pat. No. 5,710,916 to Barbara et al., which are incorporated by reference as if fully set forth herein, disclose methods that include assessing a degree of similarity between samples of handwritten information based on a comparison of the feature vectors of the samples of handwritten information.

According to one embodiment, determining whether a sample of written information matches a profile includes both "global matching" and "local matching" of features. Generally, global matching refers to assessing whether written information may belong to a set of individuals, such as one or more account owners, based on global characteristics. In global matching, global features, such as slant, tangent, and curvature entropy, in feature vectors of samples may be compared to assess whether features match. Global matching may be applied, for example, in assessing whether a payee name entry in a payee field and a legal amount entry in a legal amount field were written by the same person.

Furthermore, local matching refers to assessing whether two samples of written information correspond to the same character, word, or set of words and characters. Local matching may be applied, for example, in assessing whether a signature was written by an account owner. The signature may be compared to writing profile representations of signatures of one or more account owners. Local matching may employ mathematical techniques such as K-nearest neighbor and neural networks. For instance, in the case of a neural network applied to the legal amount field, a sample of written information and all of the variants of "One Hundred" may be converted into feature vectors. A neural net may then be trained using a standard back propagation training algorithm to assess whether the sample of written information matches at least one of the variants.

Figure 16:
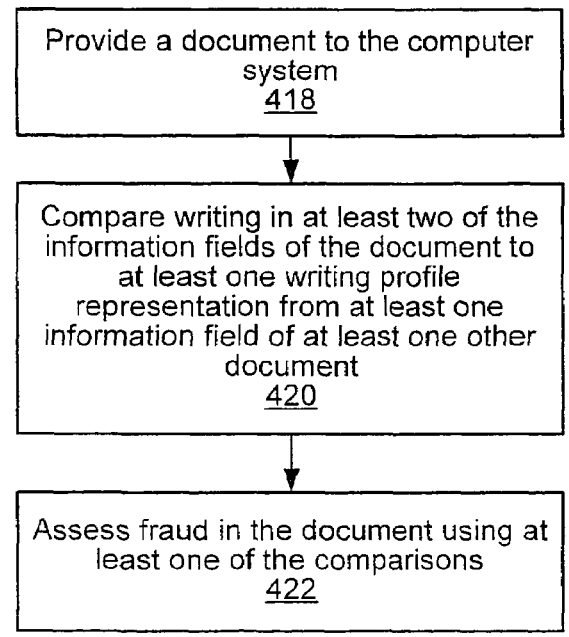
FIG. 16 depicts a flow chart of a method for assessing a document.

In certain embodiments, the writing profile may be used to assess a document, such as a payment instrument that is presented to a bank for payment. A method depicted in FIG. 16 of assessing a document may include providing a document to the computer system, as shown at step 418. The document may include at least one information field. In another embodiment, the document may include at least two information fields. The method may further include comparing writing in at least two of the information fields of the document to at least one writing profile representation, as shown at step 420. At least one writing profile representation may be from at least one information field of at least one other document. In an embodiment, at least the one other document may be a valid document. In another embodiment, the method may include comparing writing in at least one of the information fields of the document to at least one writing profile representation from at least two information fields of at least one other document. Alternatively, writing in at least one of the information fields of the document may be compared to at least two writing profile representations from at least one information field of at least one other document.

As depicted in step 422, fraud in the document may be assessed using at least one of the comparisons. In some embodiments, evidence of fraud may include a failure of at least a portion of the writing in at least one of the information fields of the document to approximately match at least one writing profile representation. Alternatively, evidence of fraud may be a failure of at least a portion of the writing in at least two of the information fields of the document to approximately match at least one writing profile representation.

Figure 17:
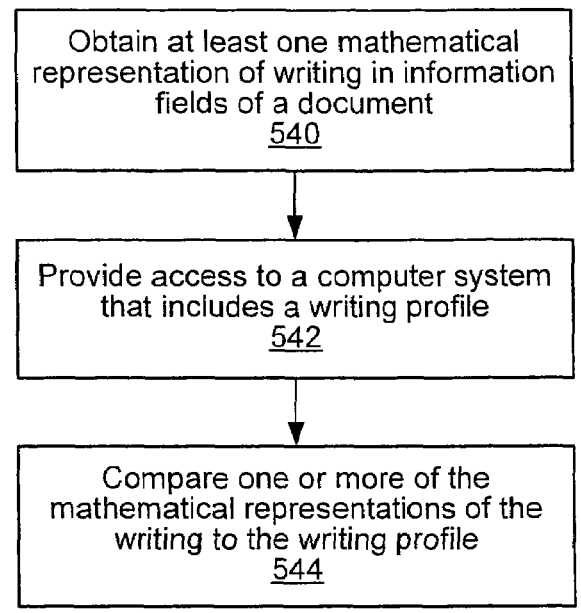
FIG. 17 depicts a flow chart of a method for assessing a document.

In certain embodiments, the information field content shape profile may be used to assess fraud in a document, such as a payment instrument that is presented to a bank for payment. A method depicted in FIG. 17 may include obtaining at least one mathematical representation of the writing from information fields of the document, as shown at step 540. In an embodiment, mathematical representations may be obtained by converting images of the written information. At least one of the mathematical representations may correspond to an example of a type of written information and/or an entry type of an information field. The method may further include providing access to a computer system that includes a writing profile, as shown by step 542. In an embodiment, the writing profile may include at least one writing profile representation of writing from one or more valid documents. At least one writing profile representation may correspond to at least one variant of a type of written information and/or an entry type of an information field. At step 544, at least one of the mathematical representations of the handwriting may be compared to one or more of the handwriting profile representations to assess whether the written information approximately matches the profile. If the written information does not approximately match the information field content shape profile, the computer may generate a flag indicating that the document is potentially fraudulent.

In one embodiment, the information field content image profile, referred to in Table 1, may include at least one image of writing on a computer system. At least one of the images may correspond to writing of authorized writers, such as one or more account owners. In an embodiment, at least one of the images may correspond to one or more entry types of an information field of a document. At least one of the images may characterize the writing of authorized writers, such as the one or more account owners. In an embodiment, at least one of the images may correspond to at least one variant of an example of a type of written information or an entry type of an information field. According to one embodiment, as described in reference to the information field content shape profile, an information field content image profile may be generated for at least one information field of a document.

In some embodiments, the information field content image profile may be used to assess fraud in a document, such as a payment instrument that is presented to a bank for payment. A method depicted in FIG. 18 may include obtaining at least one image of writing from information fields of the document, as shown at step 546. At least one image may correspond to examples of types of written information and/or entry types of one or more of the information fields. The method may further include providing access to a computer system that includes a writing profile, as shown by step 548. In an embodiment, the writing profile may include at least one handwriting profile representation from one or more documents. At least one writing profile representation may correspond to at least one variant of a type of written information and/or an entry type of an information field. At step 550, at least one of the images of the writing may be compared to at least one writing profile representation to assess whether the writing approximately matches the writing profile. If the writing does not approximately match the information field content image profile, the computer may generate a flag indicating that the document is potentially fraudulent.

Assessing a degree of similarity or matching of images of written information may be performed by several methods. These methods determine the degree of similarity between two images of a type of written information such as a type of character or set of characters, for example, a signature. U.S. Pat. No. 6,249,604 to Huttenlocher et al., which is incorporated by reference as if fully set forth herein, discusses one such method based on the technique of dynamic warping. U.S. Pat. No. 6,157,731 to Hu et al., which is incorporated by reference as if fully set forth herein, describes another such method that uses hidden Markov models.

Computer software that determines a degree of similarity of images of a type of written information may be obtained commercially. Glory Signature Verification Software (GSVS) from Glory Ltd. HIMEJI, HYOGO, Japan determines, with a degree of certainty, whether the same individual wrote two images of a type of handwritten information.

Figure 18:
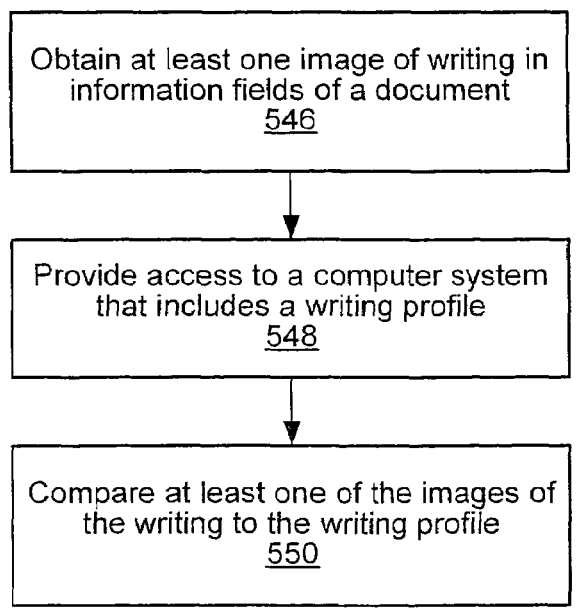
FIG. 18 depicts a flow chart of a method for assessing a document.
Figure 19:
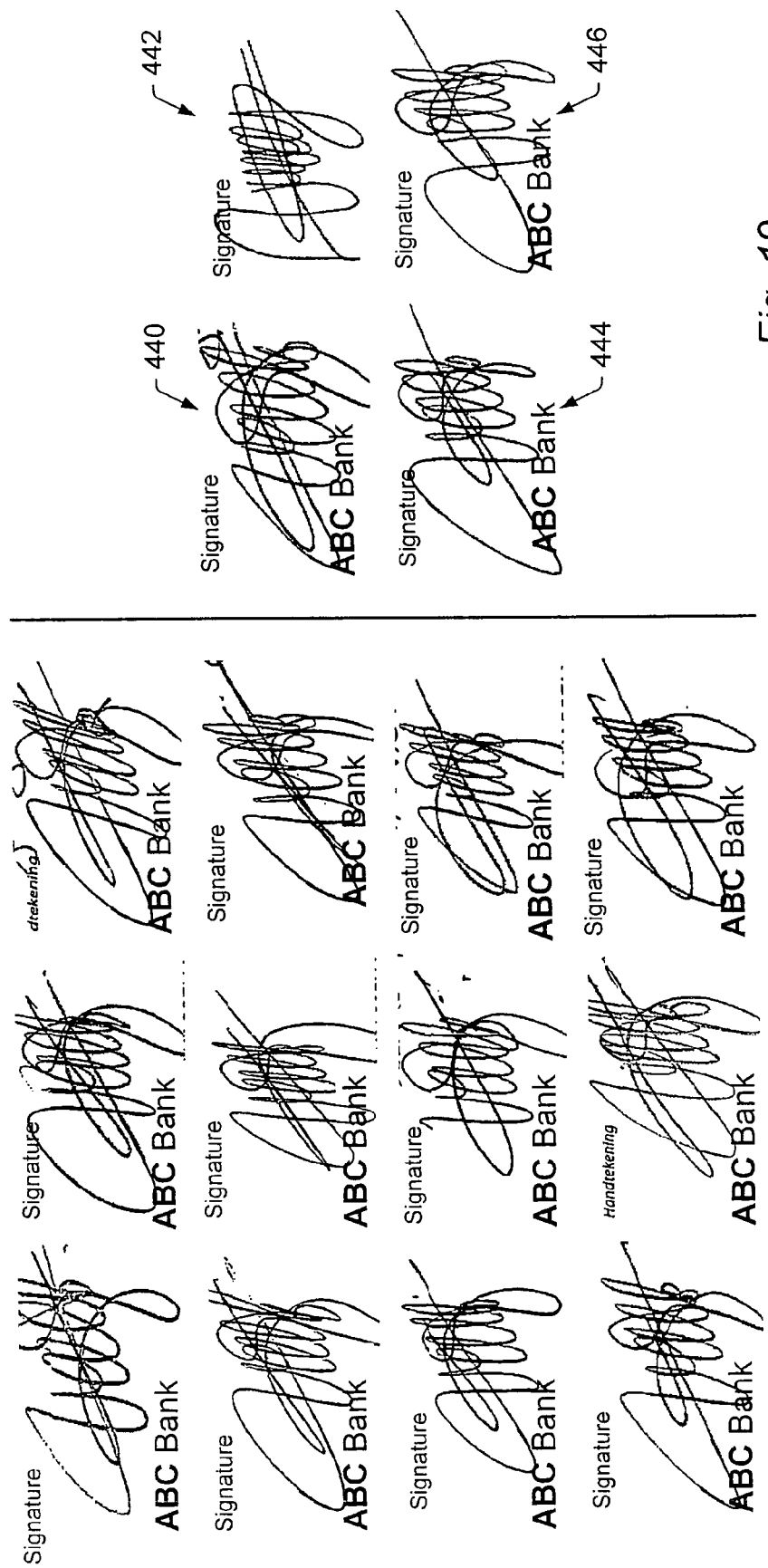

FIGS. 18 and 19 illustrate assessment of fraud in the signature field of a giro. In FIG. 19, illustrations 438 include a set of samples of handwritten information that correspond to handwriting profile representations for the signature field of a giro account. The samples of handwritten information may be stored as mathematical representations in an information field content shape profile. Alternatively, the samples of handwritten information may be stored as images in an information field content image profile. Samples 440, 442, 444, and 446 are signatures from different giros. A comparison of samples 440-446 to the profile representations 438 may indicate that it is likely that each of the samples is fraudulent.

Furthermore, in FIG. 20 illustrations 448 include a set of samples of handwritten information that correspond to profile representations for the signature field of another giro account. Sample 450 is a signature from a giro. Sample 450 may likely be assessed to be a fraudulent signature based on a comparison with illustrations 448.

FIG. 21 is an illustration of fraud assessment in the courtesy amount field of a check of a checking account. Samples 452 represent entries in a courtesy amount field from valid checks of the checking account. Sample 454 represents a courtesy amount field of a check to be validated. Information field content shape analysis may likely flag sample 454 as potentially fraudulent due to the raised '00' and the style of the '5.'

FIG. 22 is an illustration of fraud assessment in a giro. In FIG. 22, the pen thickness of the signature in signature field 436 is significantly thinner than the entries in the other fields, for example, amount field 434. Therefore, the giro may likely be flagged as potentially fraudulent.

Figure 23:
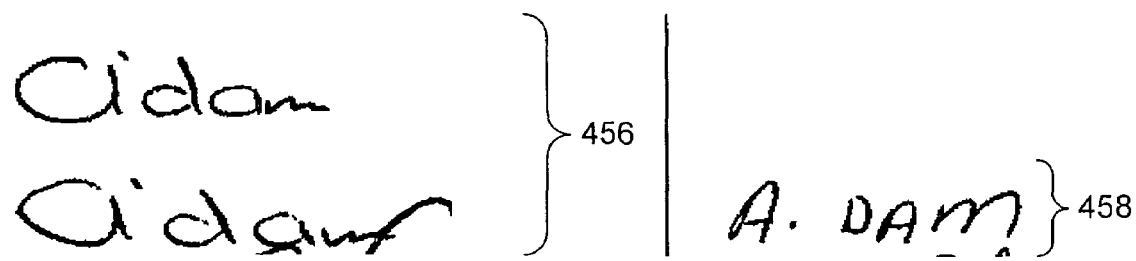
FIG. 23 is an illustration of assessing fraud in the city field of a giro.

FIG. 23 is an illustration of fraud assessment in the city field of a giro. Samples 456 are entries for a city field from valid giros of an account. Information field content shape analysis may recognize sample 458 as the same city as the entries in samples 456. However, information field content shape analysis may likely demonstrate that the handwriting is different than the valid entries. As a result, the giro may likely be flagged as potentially fraudulent.

In one embodiment, the digit/alpha profile, referred to in Table 1, may include one or more sets of written characters on a computer system. The one or more sets may correspond to one or more character types. In addition, the one or more character types may correspond to one or more types of numerals. The one or more character types may also correspond to one or more types of letters of an alphabet. A set of written characters may include at least one variant of a written character type. The variants of a character type may characterize the writing features of the character type of authorized writers, such as one or more account owners. For example, a set of handwritten '3's may represent variations in the way an account owner writes a '3.' In an embodiment, the written characters in the one or more sets may be stored as mathematical representations, as described herein, on a memory medium. Alternatively, the written characters in the one or more sets may be stored as images.

Figure 24:
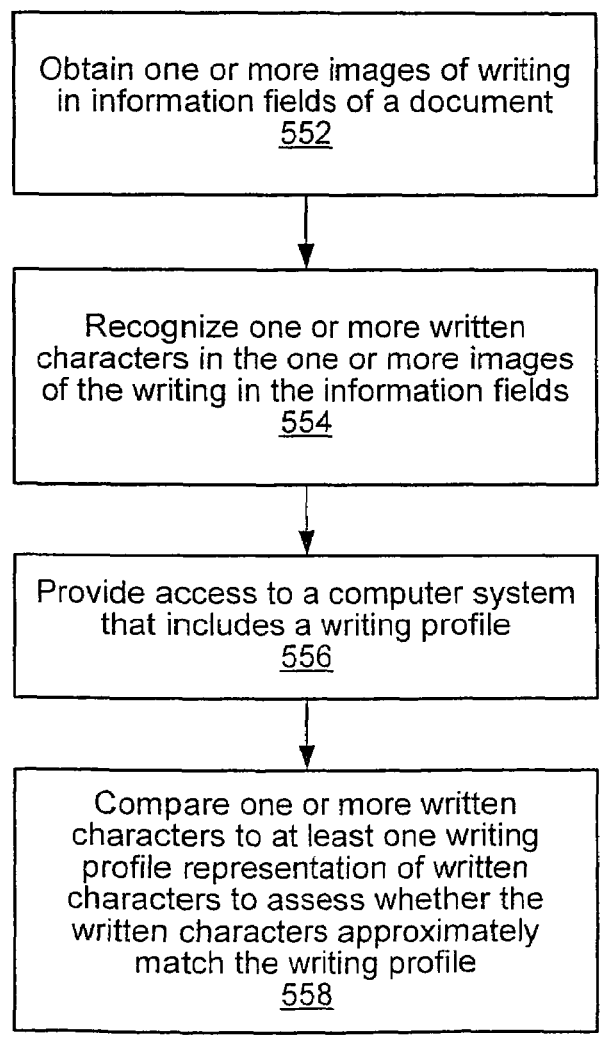
FIG. 24 depicts a flow chart of a method for assessing a document.

In certain embodiments, the digit/alpha profile may be used to assess fraud in a document, such as a payment instrument that is presented to a bank for payment. A method depicted in FIG. 24 may include obtaining one or more samples of the writing, as shown at step 552. One or more of the samples may include one or more images. In an embodiment, the handwriting in the information fields may include one or more written characters. The method may further include, as shown by step 554, recognizing one or more written characters in one or more images of the writing in the information fields. The written characters may correspond to at least one character type. The method may further include providing access to a computer system that includes a writing profile, as shown by step 556. In an embodiment, the writing profile may include one or more writing profile representations from at least one other documents. The at least one other document may be a valid document. In an embodiment, the one or more writing profile representations may include at least one variant of a type of written character. At step 558, one or more of the written characters may be compared to at least one profile representation of written characters to assess whether the written characters approximately match the writing profile. If one or more of the written characters do not approximately match the digit/alpha profile, the computer may generate a flag indicating that the document is potentially fraudulent.

In an alternative embodiment, the method may include converting one or more of the images of the written information to one or more mathematical representations, as described herein. The one or more mathematical representations may include one or more mathematical representations of written characters. One or more written characters may be recognized from the one or more mathematical representations. The method may further include comparing the mathematical representations of written characters to at least one writing profile representation of written characters to assess whether the written characters approximately match the writing profile.

Figure 25:
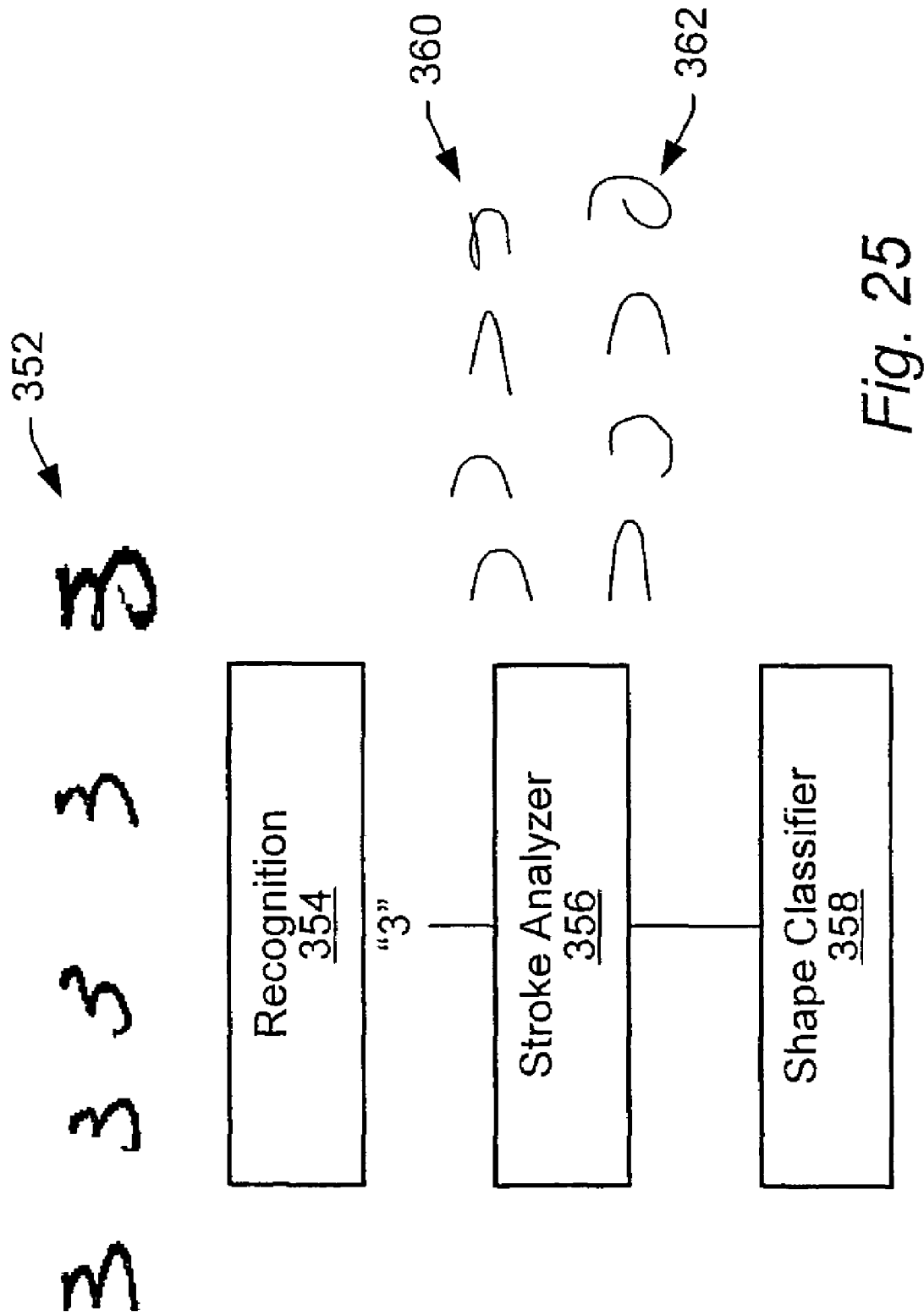
FIG. 25 illustrates converting a character in a handwriting image to a mathematical representation.

FIG. 25 is an illustration of converting a character in a handwriting image to a mathematical representation. Set of images 352 represent several variations of a handwritten '3.' At step 354, the character may be recognized using character recognition software. The strokes of the character may then be analyzed at step 356. In this case, the numeral '3' includes two strokes: upper cusp 360 and lower cusp 362. The shape of the character may be classified at step 358 using neural net or k-nearest neighbor techniques.

Figure 26:
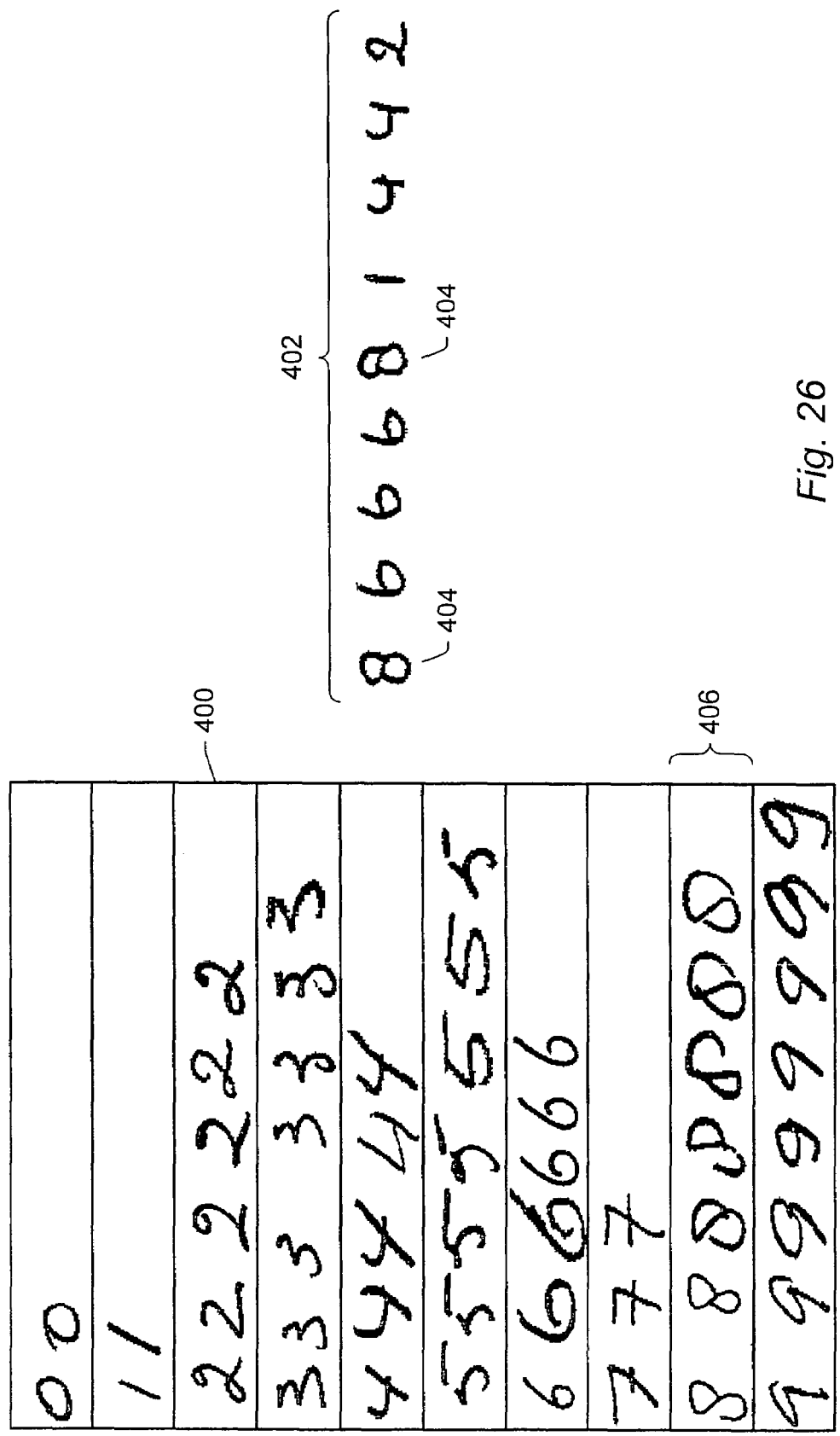
FIG. 26 illustrates assessing fraud in a numeric field of a payment instrument.

FIG. 26 illustrates assessment of fraud in a numeric information field of a payment instrument using the methods described herein. List 400 includes a digit/alpha profile for a payment instrument account for numeric characters from zero to nine. The profile includes variants of the account for each numeric type. Sample 402 corresponds to a numeric entry from a field of a payment instrument. Numerals 404 were recognized as the numeral '8' in the sample. The '8's do not appear to match the variants 406 of the numeral '8' in the profile.

In one embodiment, the symbology profile, referred to in Table 1, may include one or more written symbols on a computer system. The one or more written symbols may correspond to one or more symbol types. For example, the one or more symbol types may include, for example, one or more types of punctuation marks and/or a '+'. At least one of the written symbols may include at least one variant of a type of written symbol. The variants of a symbol type may characterize the writing features of the symbol type of designated individuals, such as one or more account owners of a payment instrument account. For example, one or more handwritten '+'s represent variations in the way an account owner may write a '+' in the legal amount field. In an embodiment, the written symbols in the symbology profile may be stored as mathematical representations, as described herein, on a memory medium. Alternatively, the written symbols in the symbology profile may be stored as images. FIG. 10 illustrates symbology in handwriting samples in the legal amount field. The symbol types in the legal amount field include symbol 350, a '+', and symbol 349, '00/100'.

Figure 27:
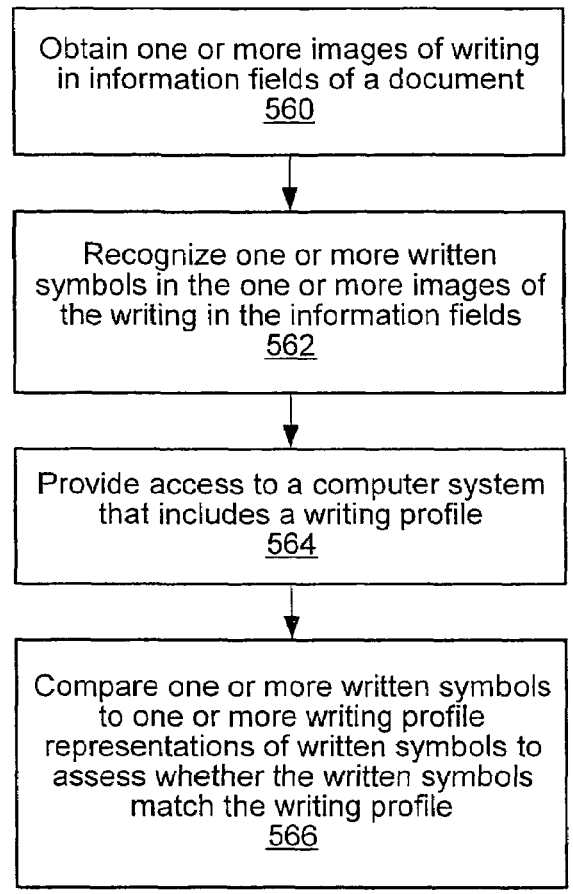
FIG. 27 depicts a flow chart of a method for assessing a document.

In certain embodiments, the symbology profile may be used to assess fraud in a document, such as a payment instrument that is presented to a bank for payment. A method depicted in FIG. 27 may include obtaining one or more samples of the writing, as shown at step 560. One or more of the samples may include one or more images. In an embodiment, the writing in the information fields may include one or more written symbols. The method may further include, as shown by step 562, recognizing one or more written symbols in one or more images of the writing in the information fields. The written characters may correspond to one or more symbol types. The method may further include providing access to a computer system that includes a writing profile, as shown by step 564. In an embodiment, the writing profile may include one or more writing profile representations from one or more documents. In an embodiment, one or more of the handwriting profile representations may include at least one variant of types of written symbols. At step 566, one or more of the written symbols may be compared to one or more of the writing profile representations of written characters to assess whether the written symbols approximately match the profile. If one or more of the written symbols do not approximately match the symbology profile, the computer may generate a flag indicating that the document is potentially fraudulent.

In an alternative embodiment, the method may include converting one or more of the images of the writing to one or more mathematical representations, as described herein. One or more of the mathematical representations may include one or more mathematical representations of written symbols. One or more written symbols may be recognized from one or more of the mathematical representations. The method may further include comparing the mathematical representations of written symbols to one or more of the writing profile representations of written symbols to assess whether the written symbols approximately match the profile.

Figure 28:
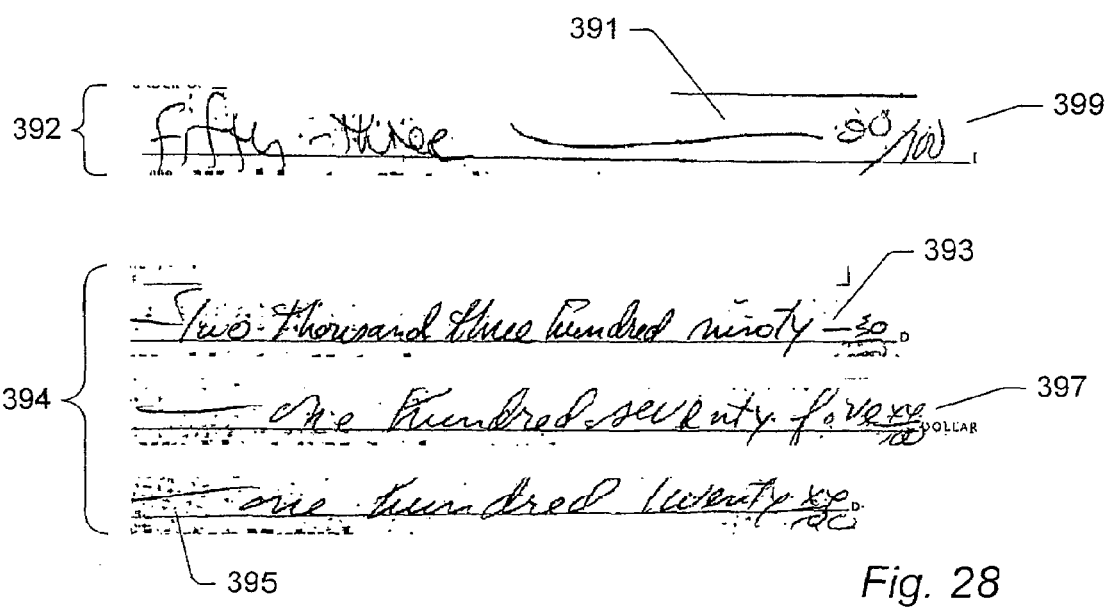
FIG. 28 is an illustration of assessing fraud in a check.

FIG. 28 is an illustration of assessment of fraud for a check of a checking account. Sample 392 represents an entry in a legal amount field of a check to be validated. Samples 394 represent entries in the legal amount field from valid checks from the checking account. Sample 392 may be determined to be potentially fraudulent by the methods described herein. First, information field content shape analysis may demonstrate that the writing of the dollar amount of sample 392 does not match samples 394. In addition, there are several differences in symbology. For example, line 391 is different than line 393. The 'xx/100' symbol differs as shown by comparing symbol 397 and symbol 399. Samples 394 include line 395, which is absent from sample 392.

In one embodiment, the syntax pattern profile, referred to in Table 1, may include at least one syntax pattern. A syntax pattern may include one or more elements. The one or more elements in a syntax pattern may be in a specific order. For example, the entries in the date field of a check may include a month of the year, a date of the month, a year, and punctuation marks. At least one syntax pattern in the writing profile may include at least one variant of a syntax pattern for an information field. For instance, at least one variant may be the manner that one or more account owners enter a date in the date field. For example, a date maybe written several ways: 2/14/01, 2-14-01, Feb. 14, 2001, and 14 Feb. 01. According to one embodiment, elements of the date field may include: a numeric month, an alphabetic month, a numeric date of the month, a two-digit year, a four-digit year, a comma, a forward slash, and a dash.

Figure 29:
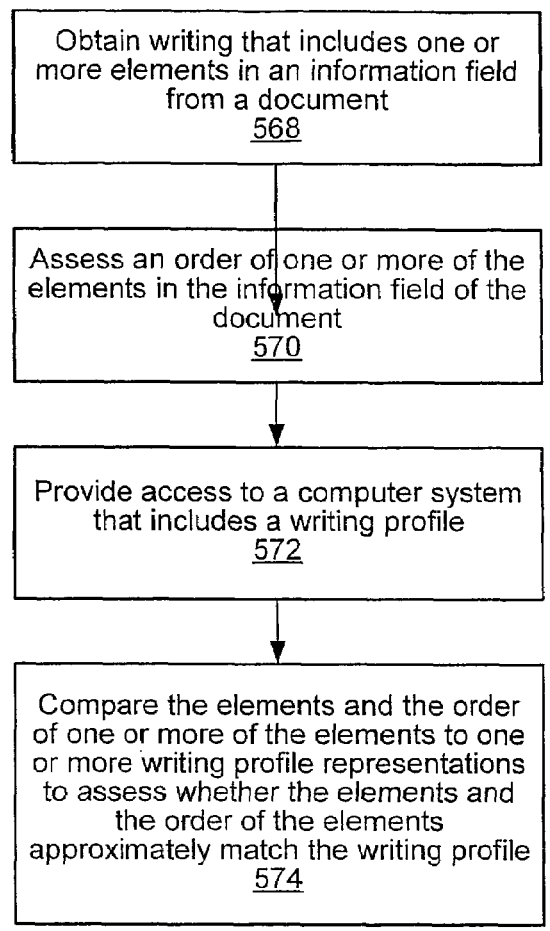
FIG. 29 depicts a flow chart of a method for assessing a document.

In one embodiment, the syntax pattern profile may be used to assess fraud in a document, such as a payment instrument that is presented to a bank for payment. A method depicted in FIG. 29 may include obtaining written information in an information field, as shown at step 568. The written information may include one or more elements. In some embodiments, the written information may be an image and the method may include recognizing one or more of the elements in the image. One or more of the elements may include, for example, written characters and symbols that may appear in the date field of a payment instrument. Alternatively, the written information may be a mathematical representation, as described herein, and the method may include recognizing one or more of the elements from the mathematical representation. An order of one or more of the elements in the information field of the document may then be assessed, as shown by step 570. The method may further include, as shown by step 572, providing access to a computer system that includes a writing profile. The handwriting profile may include one or more writing profile representations of writing from one or more valid documents. In an embodiment, the information field may be a date field and the writing profile representations may include variants of a syntax pattern, such as a written date. The method may further include comparing the elements and the order of the one or more elements to one or more writing profile representations to assess whether the elements and the order of the one or more elements approximately match the writing profile, as shown by step 574. If the elements and the order of the elements do not approximately match the syntax pattern profile, the computer may generate a flag indicating that the payment instrument is potentially fraudulent.

Figure 30:
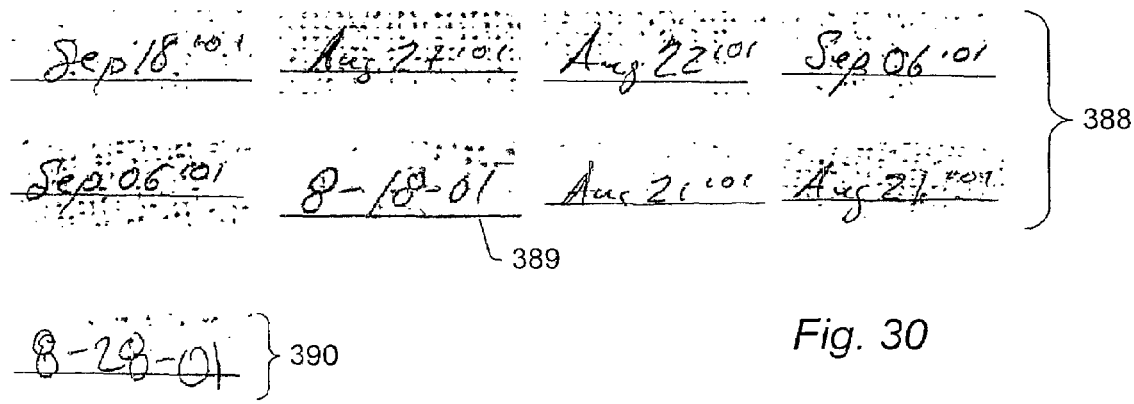
FIG. 30 illustrates assessing fraud in a date field of a payment instrument.

FIG. 30 illustrates fraud assessment in a date field of a payment instrument. Samples 388 include several examples of a date field from payment instruments for an account. The date field for the account almost consistently appears as an alphabetic month, followed by a numeric day, and a two-digit year. Date 389 is the only sample that is inconsistent. Sample 390 is a date field from a payment instrument to be tested for fraud. The syntax pattern of sample 390 approximately matches only date 389 of samples 388. In addition, the slant of sample 390 does not match date 389. Therefore, sample 390 may be potentially fraudulent.

In one embodiment, the lexicon profile, referred to in Table 1, may include one or more lexicon names for an information field of a document, such as a payment instrument. A lexicon name refers to a specific word or set of characters or symbols that has been previously recognized in documents associated with authorized writers, such as one or more account owners of a payment instrument account. In one embodiment, the list of lexicon names may be stored in memory in a computer processable format such as a ASCII format. For example, lexicon names for a payee field may include payee names that have previously appeared on checks of a checking account. Another example may include lexicon names for the city field of a giro account. In one embodiment, the lexicon profile may include a frequency associated with a lexicon name. The frequency may be a measure of the how often a lexicon name appears on a payment instrument of the account. The frequency may be expressed as a percentage of payment instruments associated with one or more of the lexicon names over a particular time period. For example, a lexicon name for a payee field may have appeared on 21% of checks written over a six month period. In some embodiments, a frequency may be associated with a subset of the lexicon names for an information field. For instance, a frequency may be associated with the top ten payee names that appear on payment instruments of the account.

Figure 31:
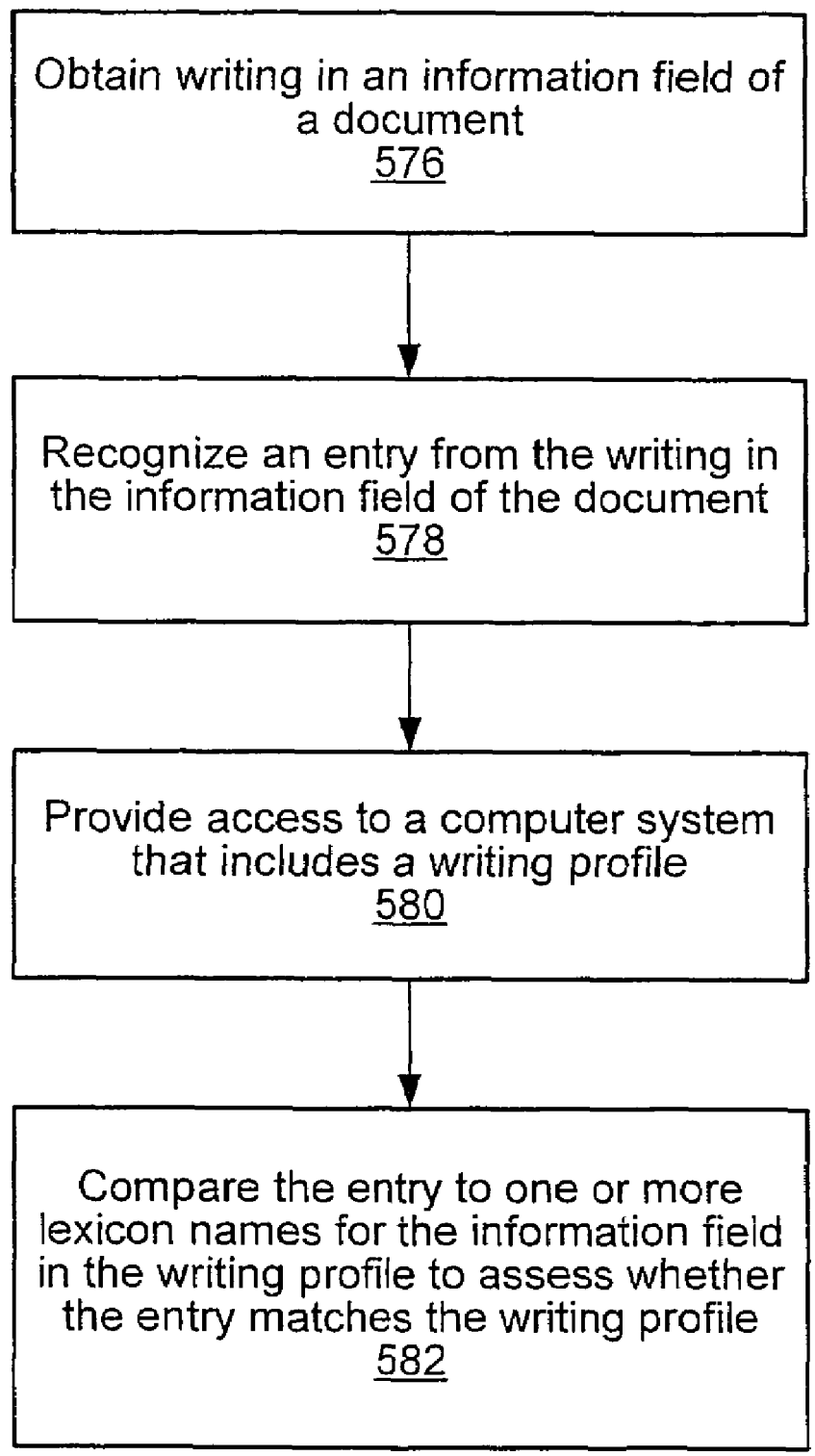
FIG. 31 depicts a flow chart of a method for assessing a document.

In certain embodiments, the lexicon profile may be used to assess fraud in a document, such as a payment instrument that is presented to a bank for payment. A method for assessing fraud is depicted in FIG. 31. In an embodiment, a method of assessing fraud in a document using a computer system may include obtaining writing in an information field of the document, as shown in step 576. The method may further include recognizing an entry from the written information in the information field of the document, as indicated in step 578. The entry may include one or more characters or symbols. The information field may be, for example, a payee field of a check and the entry may be a payee name. Alternatively, the field may be the city field of a giro and the entry may be a city name. The method may further include, as shown by step 580, providing access to a computer system that includes a writing profile. The writing profile may include one or more lexicon names for one or more information fields from one or more valid documents. In an embodiment, the method may also include comparing the entry to one or more of the lexicon names for the information field in the writing profile to assess whether the entry matches the writing profile, as shown in step 582. If the entry does not approximately match the writing profile, the computer may generate a flag indicating that the document is potentially fraudulent.

In some embodiments, the method may include determining a frequency associated with the entry if the entry approximately matches at least one of at least one of the lexicon names. If the frequency is below a certain level, the computer may generate a flag indicating that the payment instrument is potentially fraudulent. In another embodiment, the method may include assessing whether the entry is a member of a subset of lexicon names that are associated with a particular frequency. If the entry is not a member of the subset, the computer may generate a flag indicating that the document is potentially fraudulent.

Figure 32:
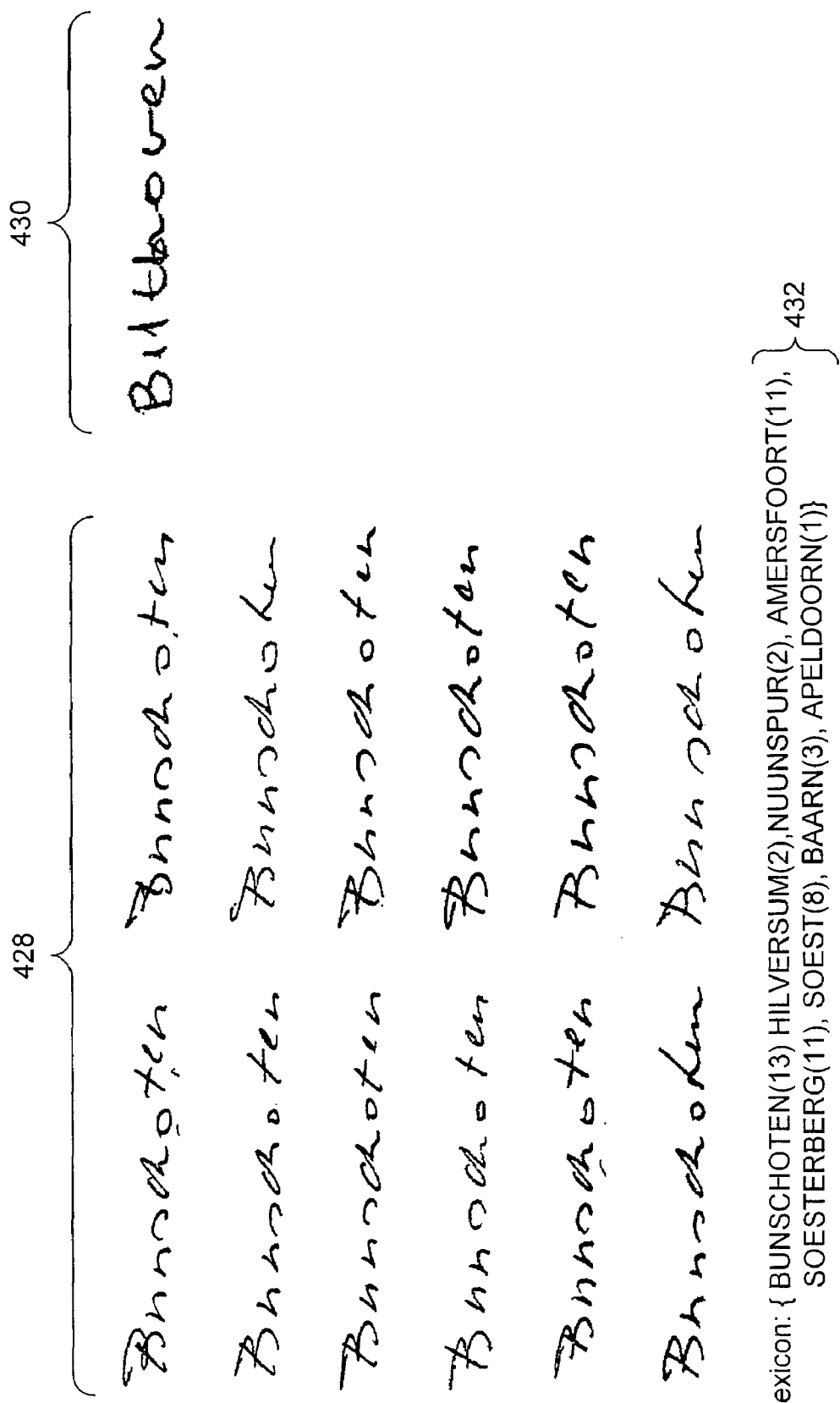
FIG. 32 illustrates assessing fraud in a city field of a giro.

FIG. 32 illustrates fraud assessment in a city field of a giro. Samples 428 represent variants of the city name "Bunschoten" for a city field of a giro account. An information field content shape or information field content image profile may include samples 428. Sample 430 is an entry in a city field of a giro. Sample 430 does not appear to approximately match samples 428 and was recognized as "Bilthoven." Lexicon 432 represents a lexicon profile that includes a list of city names that have previously appeared on giros of the account. Each city name includes a number in parenthesis indicating the number of giros on which the city name has appeared. Sample 430 also appears to fail to approximately match the lexicon profile. Therefore, the giro may be potentially fraudulent.

FIG. 33 is an illustration of fraud assessment in the memo field of a giro of a giro account. List 464 represents a list of entries that appeared in the memo field of valid giros of a giro account. List 464 may correspond to a lexicon profile. Sample 466 is an entry in the memo field of a giro to be validated. A comparison of sample 466 with the list indicates the sample is not consistent with the account. Therefore, the giro is potentially fraudulent.

In some embodiments, the information field cross correlation profile, referred to in Table 1, may include cross-field relationships for a document, such as a payment instrument account on a computer system. In particular, a writing profile may include one or more first lexicon names associated with a first information field of a payment instrument of the account on a computer system. At least one of one or more of the first lexicon names may be associated with one or more second lexicon names associated with a second information field. The first lexicon name may include an entry type of the information field and the second lexicon name may include an entry type of the second information field. The cross-field relationships in the writing profile may include relationships between information fields that occur with a particular frequency in a document, for example, in payment instruments of an account. In this manner, an entry in one information field may be used to predict a likely entry type in another information field. In one embodiment, a frequency of a particular cross-field correlation in an account may be included in the profile.

Several types of relationships between information fields may occur frequently in payment instrument accounts. For example, a particular account number entered in a memo field may be correlated with a payee name in the payee field of a check. Also, a payee name may be correlated with a particular courtesy amount. In addition, the identity of one account owner of a joint account, obtained from the signature field, may be correlated with a syntax pattern in the date field.

Figure 34:
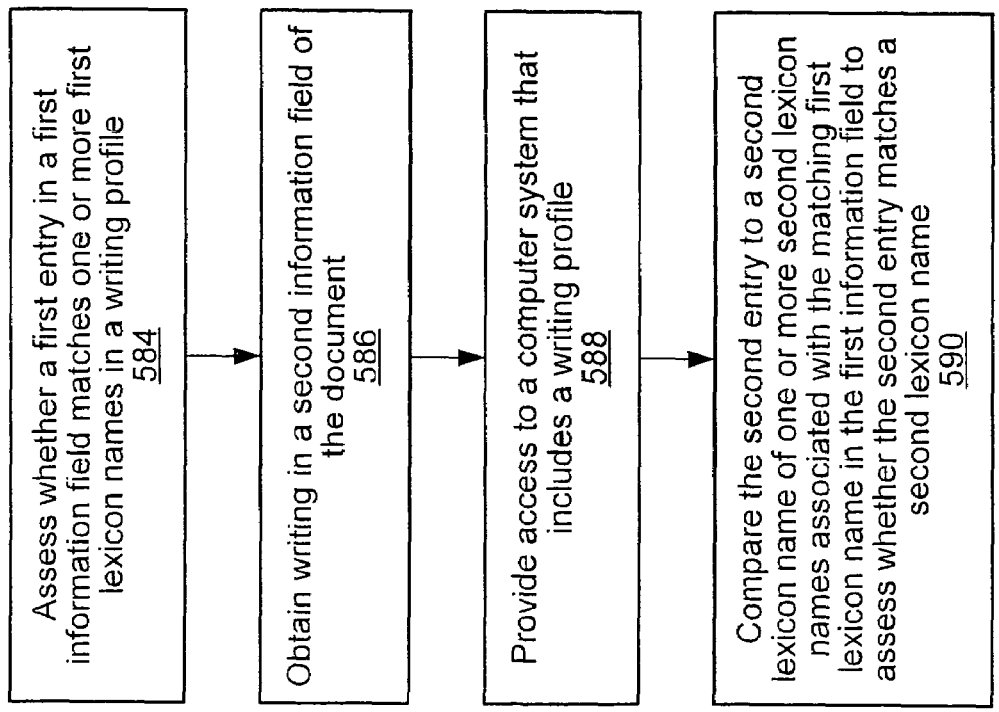
FIG. 34 depicts a flow chart of a method for assessing a document.

In certain embodiments, the information field cross correlation profile may be used to assess fraud in a document, such as a payment instrument that is submitted to a bank for payment. A method for validating a payment instrument is depicted in FIG. 34. The method may include assessing whether a first entry in a first information field approximately matches one or more first lexicon names in a handwriting profile for the first information field, as shown by step 584. The method may further include, as shown by step 586, obtaining writing in a second information field of the document. Access may then be provided to the computer system that includes a writing profile, as shown by step 588. The handwriting profile may include cross-field correlations from one or more valid documents. The method may further include comparing the second entry to a second lexicon name of one or more second lexicon names associated with the approximately matching first lexicon name in the first information field. The comparison may be used to assess whether the second entry approximately matches a second lexicon name, as shown by step 590. If the second entry does not match a second lexicon, the computer may generate a flag indicating that the document may be potentially fraudulent. In another embodiment, the frequency that the first lexicon name approximately matches the second lexicon name may be considered in fraud assessment of the document.

Figure 35:
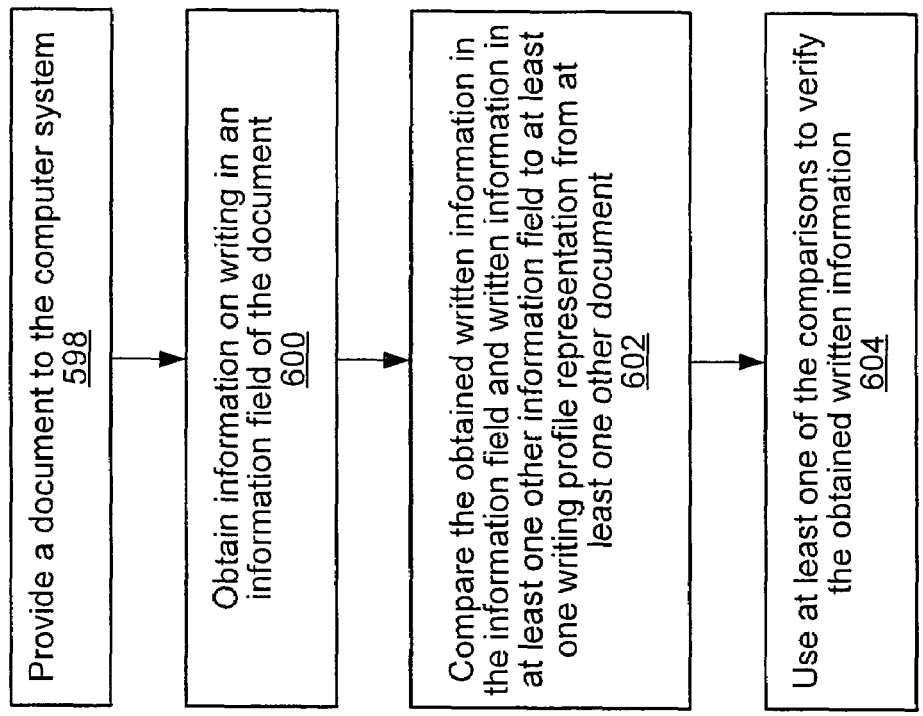
FIG. 35 depicts a flow chart of a method for assessing a document.

An embodiment of a method of assessing information in at least one information field in a document is depicted by a flow chart in FIG. 35. In an embodiment, one or more of the documents may be a payment instrument. The information fields may include writing of one or more account owners of a payment instrument account. The method may include providing a document to the computer system, as shown in step 598 of FIG. 35. In one embodiment, the documents may include at least one information field. In other embodiments, the document may include at least two information fields. The document may be provided by accessing at least one image from a database in memory on a computer system. In certain embodiments, the method may include obtaining information on writing in an information field of the document, as shown in step 600. In some embodiments, obtaining information on writing may include recognizing written information in an information field. For example, a payee name in a payee field of a payment instrument may be recognized.

As shown in step 602, the method may further include comparing the obtained written information in the information field and written information in at least one other information field to at least one writing profile representation from at least one other document. Alternatively, the obtained written information in the information field and written information in at least two other information fields may be compared to at least one handwriting profile representation from at least one other document. In other embodiments, the method may include comparing the obtained written information in the information field and written information in at least one other information field to at least two writing profile representations from at least one other document.

In an embodiment, at least one of the other documents may be valid. In certain embodiments, at least one of the writing profile representations may include written information from the information field and written information from at least one of the other information fields. The written information from the information fields may be from at least one of the other documents. For example, at least one writing profile representation may include a cross-field correlation between the information field and at least the one other information field. In one embodiment, the cross-field correlation may include a lexicon name for the information field and at least one lexicon name for at least the one other information field.

In some embodiments, at least one of the comparisons of written information may be used to verify the obtained written information, as shown in step 604. In one embodiment, written information may be verified by assessing whether the obtained written information in the information field and the written information in at least one other information field approximately matches at least one writing profile representation from at least one other document.

In some embodiments, the document stock or pre-printed profile, referred to in Table 1, may include one or more stock characteristics or pre-printed information of a document associated with authorized writers, such as one or more account owners. For example, the stock characteristics may characterize a layout of the payment instrument corresponding to the account. Stock characteristics may include one or more graphics elements, as well as their location, on the payment instrument of the account. Graphics elements may include, for example, bank logos. The size of the payment instrument of the account may also be a stock characteristic. In addition, stock characteristics may include one or more machine-printed text blocks, along with their locations. Text blocks may include, for example, an address of one or more account owners and account numbers. The document stock profile may include a machine-printed profile analogous to a variable writing profile for information fields. The machine-printed profile may include mathematical representations and/or images of machine-printed text in the text blocks of documents.

Figure 36:
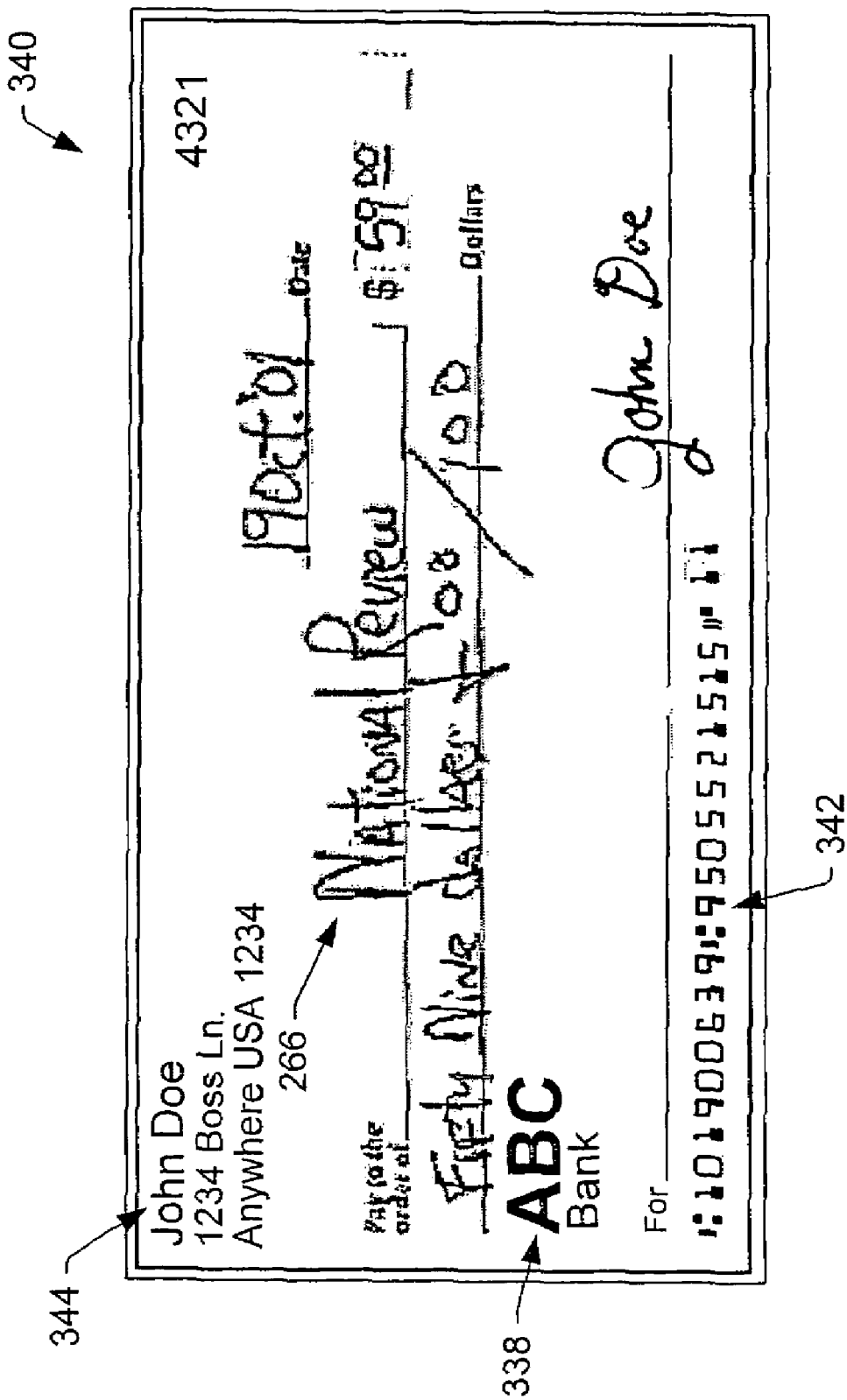
FIG. 36 depicts stock characteristics of a check.

FIG. 36 depicts stock characteristics of a check 340. Label 338 indicates graphics elements that consist of logos. Label 342 indicates an account/routing order number. In addition, label 344 is the name and address of the account owner.

In certain embodiments, a pre-printed profile may be used to assess a document, such as a payment instrument that is presented to a bank for payment. A method depicted in FIG. 37 of assessing a document may include providing a document to the computer system, as shown at step 530. The document may include at least one information field. In another embodiment, the document may include at least two information fields. The method may further include comparing pre-printed information in at least two of the information fields of the document to at least one pre-printed profile representation from at least information field of at least one other document, as shown in at step 532. In an embodiment, at least the one other document may be a valid document. In another embodiment, the method may include comparing pre-printed information in at least one of the information fields of the document to at least one pre-printed profile representation from at least two information fields of at least one other document. Alternatively, pre-printed information in at least one of the text blocks of the document may be compared to at least two pre-printed profile representations from at least one text block of at least one other document.

Pre-printed information may include, but is not limited to a mathematical representation and/or an image. Pre-printed information may also include, but is not limited to at least one type of pre-printed information such as a word type, character type and/or graphic element. Pre-printed information may further include, but is not limited to a global feature of pre-printed information and a local feature of pre-printed information.

As depicted in step 534, fraud in the document may be assessed using at least one of the comparisons. In some embodiments, potential fraud may be indicated by a failure of at least a portion of the pre-printed information in at least one of the information fields of the document to approximately match at least one pre-printed profile representation. Alternatively, potential fraud may be indicated by a failure of at least a portion of the pre-printed information in at least two of the information fields of the document to approximately match at least one pre-printed profile representation.

Figures 37, 38:
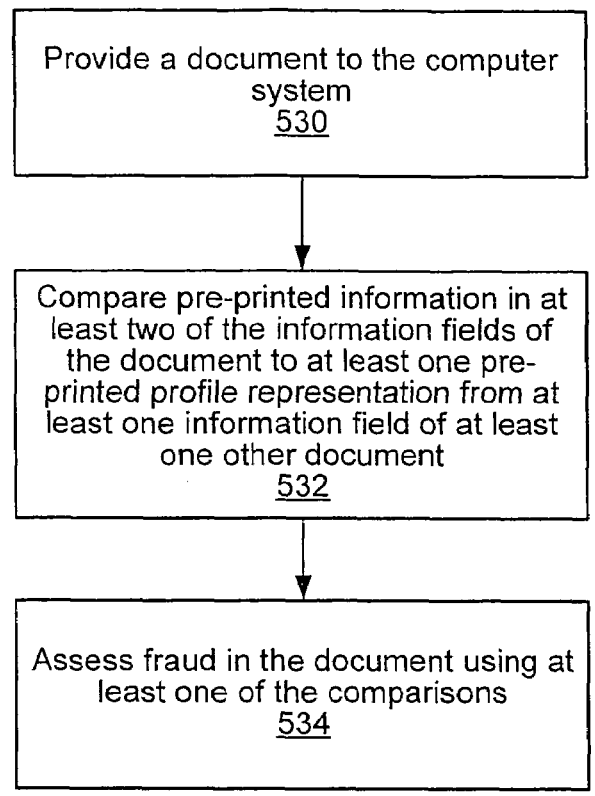
FIG. 37 depicts a flow chart of a method for assessing a document.
FIG. 38 illustrates assessing fraud in a giro.

FIG. 38 illustrates fraud assessment in a giro. Text 424 represents machine-printed text that is a stock characteristic from a giro of an account. Text 425 and 426 represent the corresponding machine-printed text from giros presented for payment. The size of text 424 is 260 pixels×80 lines. Text 425 and 426 have a size of 350 pixels×95 lines. The inconsistency may indicate potential fraud.

In certain embodiments, fraud may be assessed from variances in writing within an information field of a document, such as a payment instrument. Variances may occur when a forger alters a specific portion of a document, such as a payment instrument. For example, a forger may alter the amount in the courtesy amount field by writing in one or more additional numbers. Therefore, an information field may contain written characters of the same type written both by a forger and by designated individuals, such as one or more of the account owners.

FIG. 39 depicts an embodiment of a method of assessing a document, such as a payment instrument using a computer system. The method may include providing a document to a computer system, as shown in step 592. In an embodiment, the document may include at least one information field. In some embodiments, writing in at least one of the information fields of the document may include at least two examples of a type of written information. Writing may include, but is not limited to types of characters, words, symbols, and/or other writing features. Other writing features may include, but are not limited to local slant, global slant, or pen thickness. For example, written characters may include one or more character types, as described herein. An information field may include written characters of the same character type. For instance, a courtesy amount field of a payment instrument may read '3,740.53.' This courtesy amount field includes two examples of a type of written information, the first '3' and the second '3.' In some embodiments, the writing may include an image. Alternatively, the writing may include a mathematical representation. In an embodiment, examples of types of written information may be recognized from an image and/or a mathematical representation.

The method may further include, as shown by step 594, comparing at least two of the examples of the type of written information. At step 596, the method may additionally include assessing whether two or more of the examples approximately match. In the case cited above, the first and the second '3' may be compared to assess whether they match. One embodiment may include comparing images of examples of a type of written information with image comparison software. Alternatively, examples of a type of written information may be converted to mathematical representations. In this case, the handwriting features of the mathematical representations may be compared. If at least two of the examples of written information do not approximately match, the computer may generate a flag indicating that the document may be potentially fraudulent.

In some embodiments, the method may further include comparing the examples of types of written information to at least one writing profile representation. For example, examples of types of handwritten characters may be compared to writing profile representations in the digit/alpha profile.

Some embodiments may include a method of assessing fraud from variances in writing between different information fields of a document. In one embodiment, a document may include at least two information fields. At least two information fields of the document include at least one example of a type of written information. The method may include comparing at least two of the examples in at least two of the information fields. The method may further include assessing whether two or more of the examples approximately match. For instance, numerals in a date field and numerals in a courtesy amount field of a payment instrument may be compared. For example, a courtesy amount field may read '3,340.53.' A date field of the same payment instrument may read '1/4/03.' Both the courtesy field and the date field include examples of a written '4,' which may be compared. If at least two of the examples of the type of written information do not approximately match, the computer may generate a flag indicating that the document may be potentially fraudulent.

FIG. 40 is an illustration of assessing fraud from variations in handwriting in the same information field and between different information fields of a giro. FIG. 40*a* depicts amount field 372 and credit account field 374 from a giro. Two apparent differences may be assessed between the two information fields. First, there is a difference in ink thickness between information fields. Second, there is a difference in the style of the '6' between the two information fields.

FIG. 40*b* depicts amount field 376 and credit account field 378 from a giro. There is a difference in style between the two '5's in the account field. In addition, there is a difference in style of the '2' is the amount field and the '2' in the account field.

FIG. 40*c* depicts amount field 380 and credit account field 382 from a giro. Variations exist in ink thickness for digits in the account field. In addition, there is a variation in slant for digits in the account field. Also, a difference in style is exhibited for the '3' and '5' between the amount and account fields.

FIG. 40*d* depicts amount field 384 and credit account field 386 from a giro. There are differences in style for the '7', '2', and '4' between the amount and account field. In addition, there is a variation in slant between digits in the account field.

In one embodiment, a handwriting profile, such as a payment instrument account profile, may include a database of previously identified forgers. The database may further include a forger writing profile for one or more identified forgers. The forger writing profile is analogous to the writing profile for authorized writers, such as one or more account owners, shown in Table 1. A forger profile may include at least some writing profile information obtained from previously identified forged documents, such as payment instruments, associated with a forger.

Figure 41:
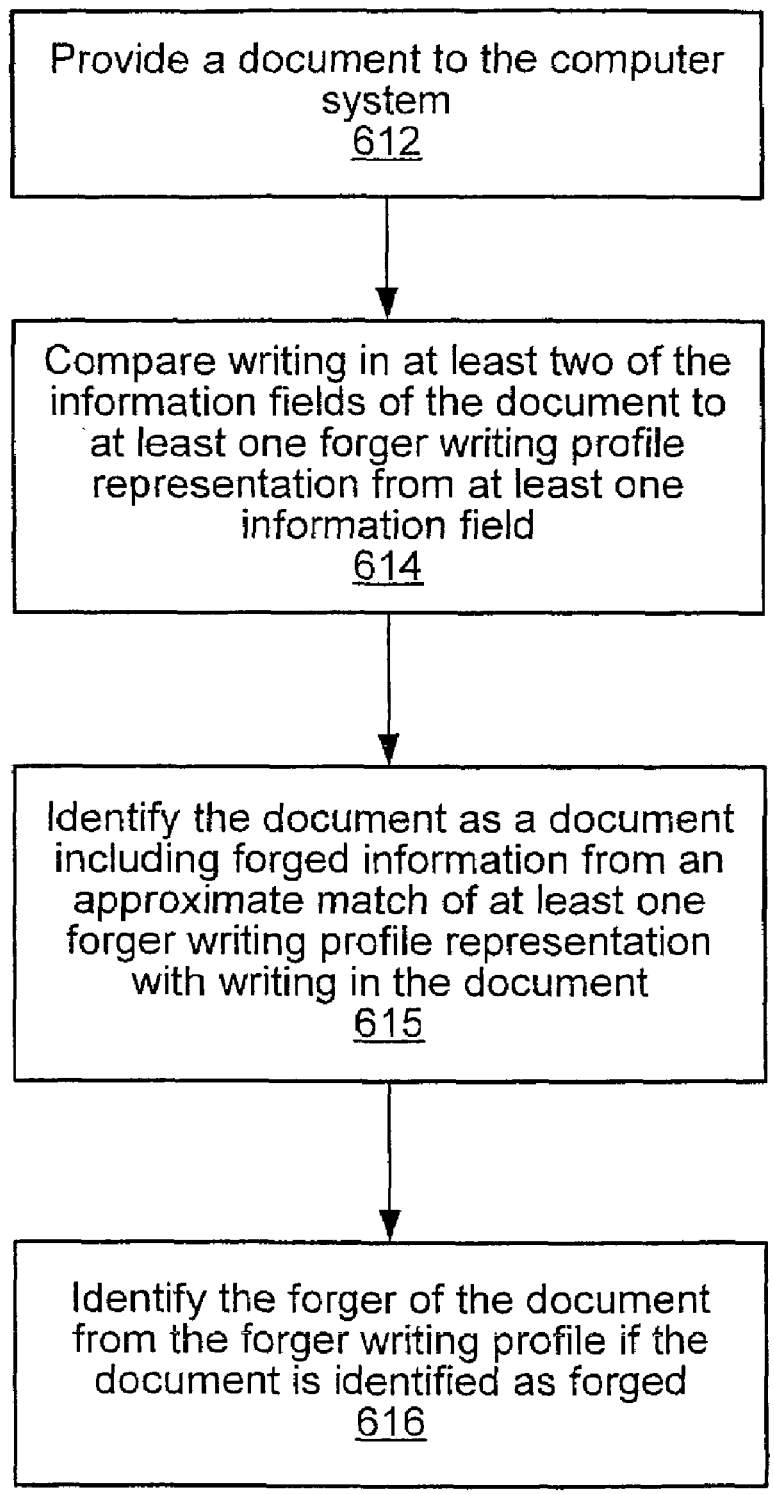
FIG. 41 depicts a flow chart of a method for assessing a document.

FIG. 41 depicts an embodiment of a method for identifying a document comprising forged information using a computer system. The method may include providing a document to the computer system, as shown by step 612. In one embodiment, the document may include at least one information field. In another embodiment, the document may include at least two information fields. As shown at step 614, the method may further include comparing writing in at least two of the information fields of the document to at least one forger writing profile representation from at least one information field. In another embodiment, the method may include comparing writing in at least one of the information fields of the document to at least one forger writing profile representation from at least two information fields of at least one forged document. In some embodiments, writing in at least one of the information fields of the document may be compared to at least one forger writing profile representation from at least two information fields of at least one forged document Additionally, as shown at step 615, the method may include identifying the document as a document comprising forged information from an approximate match of at least one forger writing profile representation with writing in the document. The method may further include identifying the forger of the document from the forger writing profile if the document is identified as forged, as indicated by step 616.

For many financial services companies keying labor represents a large data capture cost. For example, one of the most expensive keying operations is the keying of data from a written information field, such as a payee name. Keying labor may be reduced through application of a writing profile, such as a payment instrument account profile. A profile, as described in Table 1, may be used to capture written information in information fields of documents, such as payment instruments presented for payment.

Figure 42:
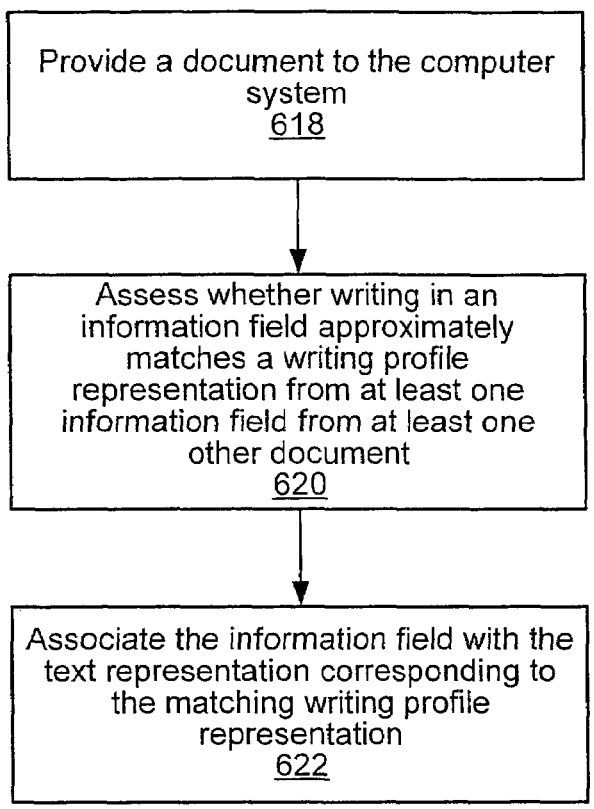
FIG. 42 depicts a flow chart of a method for capturing written information from a document.

FIG. 42 depicts an embodiment of a method of capturing written information from an information field of a document using a computer system. The method may include providing a document to the computer system, as shown by step 618. In one embodiment, the document may include at least one information field. In one embodiment, the document may include at least two information fields. The method may further include assessing whether writing in an information field approximately matches a writing profile representation from at least one information field from at least one other document, as indicated by step 620. In an embodiment, the matching writing profile representation is associated with a corresponding text representation. In some embodiments, the text representations may be stored in memory in a computer processable format on the computer system. For example, the computer processable format may be ASCII format. As shown by step 622, the information field may then be associated with the text representation corresponding to the matching writing profile representation. The writing in the information field may be a mathematical representation, as described herein. The matching text representation may be assessed from features included in writing profile representations that include mathematical representations from the writing profile.

Figure 43:
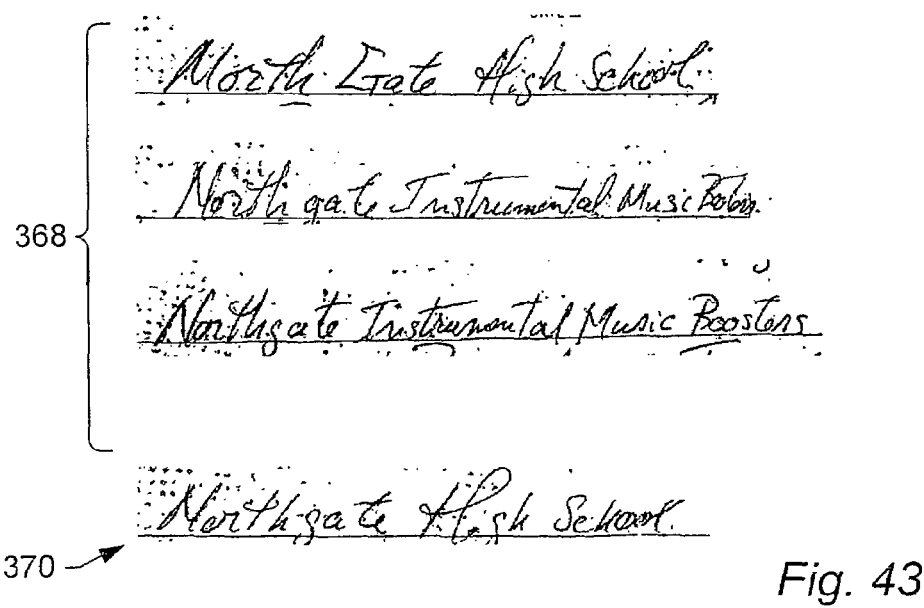
FIG. 43 illustrates capturing written information from a document.

FIG. 43 illustrates the capture of an entry in an information field of a payment instrument. Samples 368 represent entries in payee fields extracted from valid checks. The entries may be included in a checking account profile and may be stored as mathematical representations. Sample 370 is an entry in a payee field of a check is to be captured. Sample 370 may be identified as "NORTHGATE HIGH SCHOOL" from the handwriting features in the mathematical representations in samples 368.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A method of assessing information in a document using a computer system, comprising:
   providing a document to the computer system, wherein the document comprises at least two information fields;
   obtaining information on writing in an information field of the document;
   comparing, using at least one processor of the computer system, the obtained written information in the information field and written information in at least one other information field to at least two writing profile representations from at least one other document, wherein at least one of the writing profile representations has been stored in the computer system,
   wherein at least two of the writing profile representations comprise written information from the information field and written information from at least one of the other information fields from at least the one other document.

2. The method of claim 1, further comprising using at least one of the comparisons of written information to verify the obtained written information.

3. The method of claim 1, further comprising assessing whether the obtained written information in the information field and the written information in at least one other information field approximately matches at least one writing profile representation from at least one other document.

4. The method of claim 1, wherein at least one writing profile representation comprises a cross-field correlation between the information field and at least the one other information field, wherein the cross-field correlation comprises a lexicon name for the information field and at least one lexicon name for at least the one other information field.

5. The method of claim 1, wherein obtaining information on writing comprises recognizing written information.

6. The method of claim 1, further comprising assessing a frequency associated with the written information in the information field if the written information in the information field and written information in at least one other information field approximately matches at least one writing profile representation.

7. The method of claim 1, further comprising assessing whether the written information in the information field comprises written information associated with a particular frequency.

8. The method of claim 1, wherein providing the document to the computer system comprises providing images of the document to the computer system.

9. The method of claim 1, wherein comparing written information comprises comparing at least one characteristic of the writing.

10. The method of claim 1, wherein at least one writing profile representation is obtained from a valid document.

11. The method of claim 1, wherein at least one of the documents comprises a payment instrument, and wherein the writing is writing from at least one account owner of an account of the payment instrument.

12. The method of claim 1, wherein providing the document to the computer system comprises obtaining images of writing of at least one information field.

13. The method of claim 1, wherein the written information in the information field comprises an image.

14. The method of claim 1, wherein the written information comprises at least one mathematical representation.

15. The method of claim 1, wherein the written information in the information field comprises at least one image.

16. The method of claim 1, wherein the written information in the information field comprises at least one type of written information.

17. The method of claim 1, wherein the written information in the information field comprises at least one type of written information, and wherein at least one type of written information comprises a word type.

18. The method of claim 1, wherein the written information in the information field comprises at least one type of written information, and wherein at least one type of written information comprises a character type.

19. The method of claim 1, wherein the written information in the information field comprises at least one global feature of the writing.

20. The method of claim 1, wherein the written information in the information field comprises at least one local feature of the writing.

21. The method of claim 1, wherein the written information in the information field comprises at least one syntax pattern.

22. The method of claim 1, wherein the written information in the information field comprises at least one lexicon name for at least one information field.

23. The method of claim 1, wherein at least one writing profile representation comprises at least one mathematical representation.

24. The method of claim 1, wherein at least one writing profile representation comprises at least one image.

25. The method of claim 1, wherein at least one writing profile representation comprises at least one type of written information.

26. The method of claim 1, wherein at least one writing profile representation comprises at least one writing variant of an example of at least one type of written information.

27. The method of claim 1, wherein at least one writing profile representation comprises at least one writing variant of an example of at least one type of written information, and wherein at least one type of written information comprises a word type.

28. The method of claim 1, wherein at least one writing profile representation comprises at least one writing variant of an example of at least one type of written information, and wherein at least one type of written information comprises a character type.

29. The method of claim 1, wherein at least one writing profile representation comprises at least one writing variant of an example of at least one type of written information, and further comprising determining at least one of the variants with a cluster algorithm.

30. The method of claim 1, wherein at least one writing profile representation comprises at least one global characteristic of the writing.

31. The method of claim 1, wherein at least one writing profile representation comprises at least one local characteristic of the writing.

32. The method of claim 1, wherein at least one writing profile representation comprises at least one variant of a syntax pattern.

33. The method of claim 1, wherein at least one writing profile representation comprises at least one lexicon name for at least one information field.

34. A system, comprising:
a CPU;
a data memory coupled to the CPU; and
a system memory coupled to the CPU, wherein the system memory is configured to store one or more computer programs executable by the CPU, and wherein the computer programs are executable to implement a method of assessing information in a document, the method comprising:
providing a document to the computer system, wherein the document comprises at least two information fields;
obtaining information on writing in an information field of the document;
comparing the obtained written information in the information field and written information in at least one other information field to at least two writing profile representations from at least one other document,
wherein at least two of the writing profile representations comprise written information from the information field and written information from at least one of the other information fields from at least the one other document.

35. A computer readable memory medium having stored program instructions thereon, wherein the stored program instructions are computer-executable to implement a method of assessing information in a document, the method comprising:
providing a document to the computer system, wherein the document comprises at least two information fields;
obtaining information on writing in an information field of the document;
comparing the obtained written information in the information field and written information in at least one other information field to at least two writing profile representations from at least one other document,
wherein at least two of the writing profile representations comprise written information from the information field and written information from at least one of the other information fields from at least the one other document.

* * * * *